United States Patent [19]
Bell

[11] Patent Number: 5,249,826
[45] Date of Patent: Oct. 5, 1993

[54] INERTIAL MASS SAFETY SYSTEM ACTIVATION FOR PERSONAL VEHICLES

[75] Inventor: Lon Bell, Pasadena, Calif.
[73] Assignee: Amerigon, Inc., Burbank, Calif.
[21] Appl. No.: 771,469
[22] Filed: Oct. 3, 1991
[51] Int. Cl.[5] .............................. B62D 1/11
[52] U.S. Cl. ................... 280/777; 280/753
[58] Field of Search ............. 280/734, 806, 777, 753

[56] References Cited

U.S. PATENT DOCUMENTS

| | | | |
|---|---|---|---|
| 3,531,153 | 9/1970 | Mohs | 296/65.1 |
| 4,598,931 | 7/1986 | Miyada | 280/753 |
| 4,703,827 | 11/1987 | Vollmer et al. | 180/232 |
| 4,884,652 | 12/1989 | Vollmer | 280/777 |
| 4,915,411 | 4/1990 | Norton | 280/734 |
| 5,054,870 | 10/1991 | Backhaus et al. | 280/777 |

Primary Examiner—Kenneth R. Rice
Attorney, Agent, or Firm—Christie, Parker & Hale

[57] ABSTRACT

A dense mass centrally located in a personal vehicle acts as an inertial analog computer for predicting and compensating motion of an occupant of the vehicle during crashes. Acceleration and motion of the mass is converted into motion of impact prevention or impact velocity reduction systems to reduce likelihood of severe injury to the occupant. Power disconnection in alternatively powered vehicles through disconnection of electrical systems by motion of the mass provides additional safety during the crash.

8 Claims, 21 Drawing Sheets

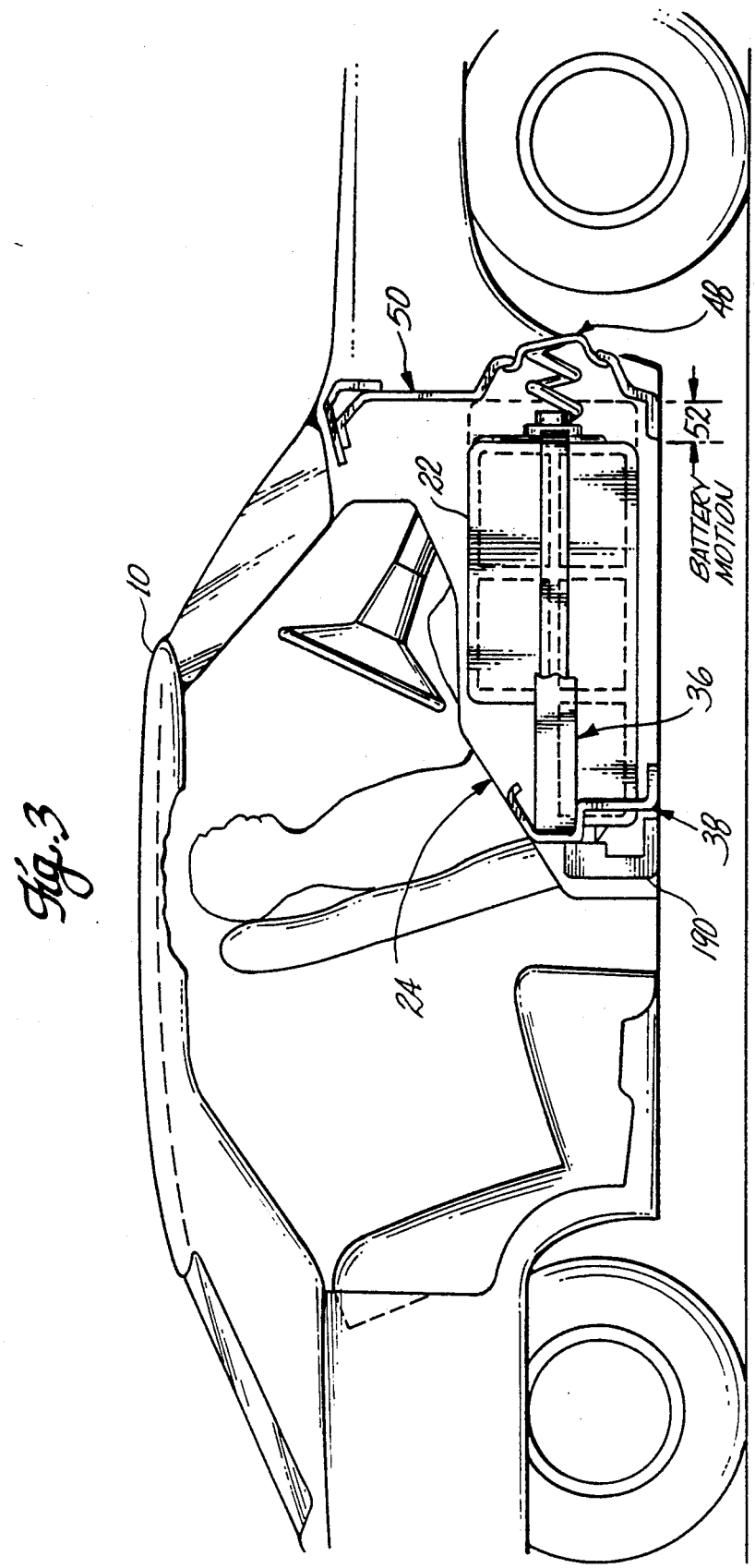

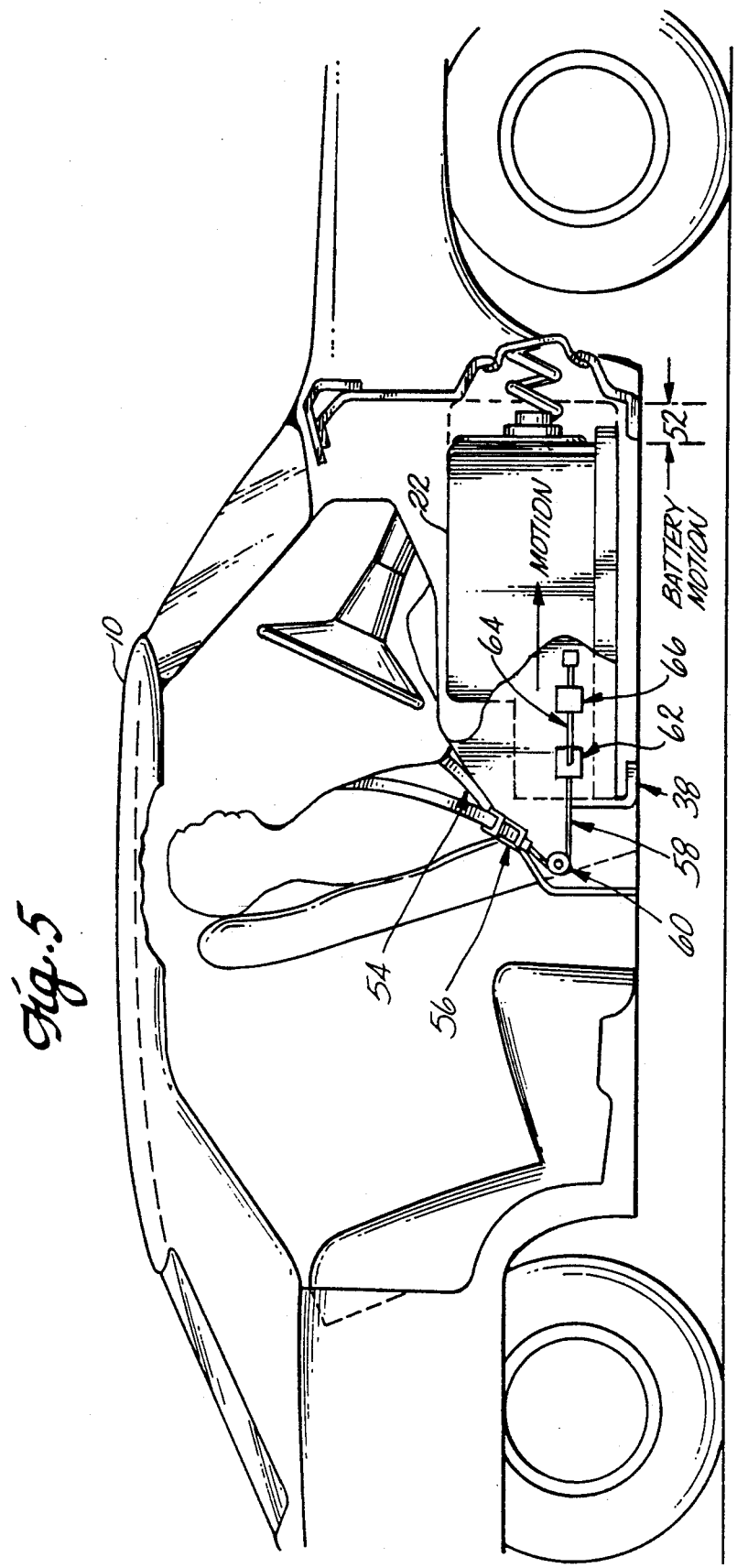

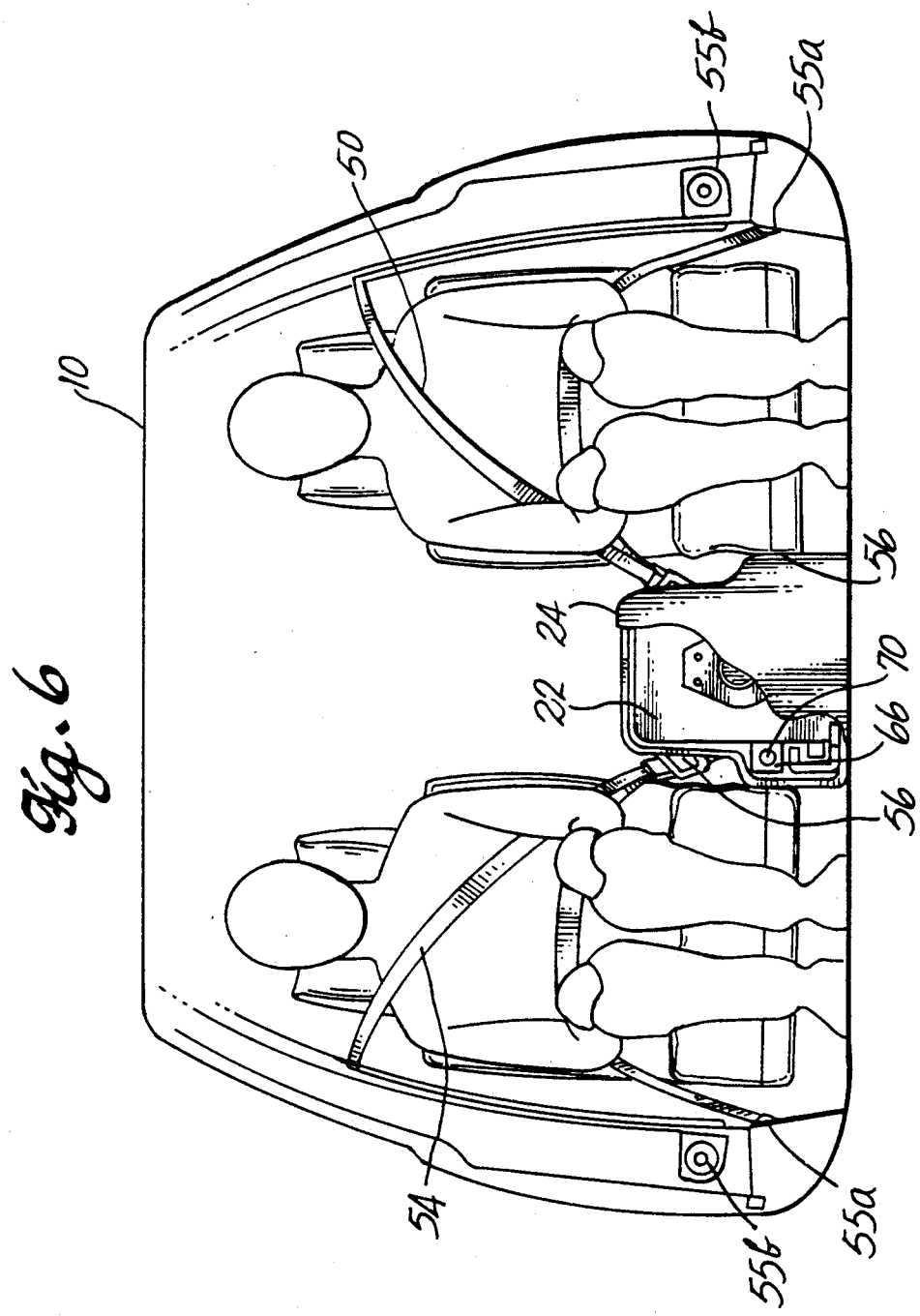

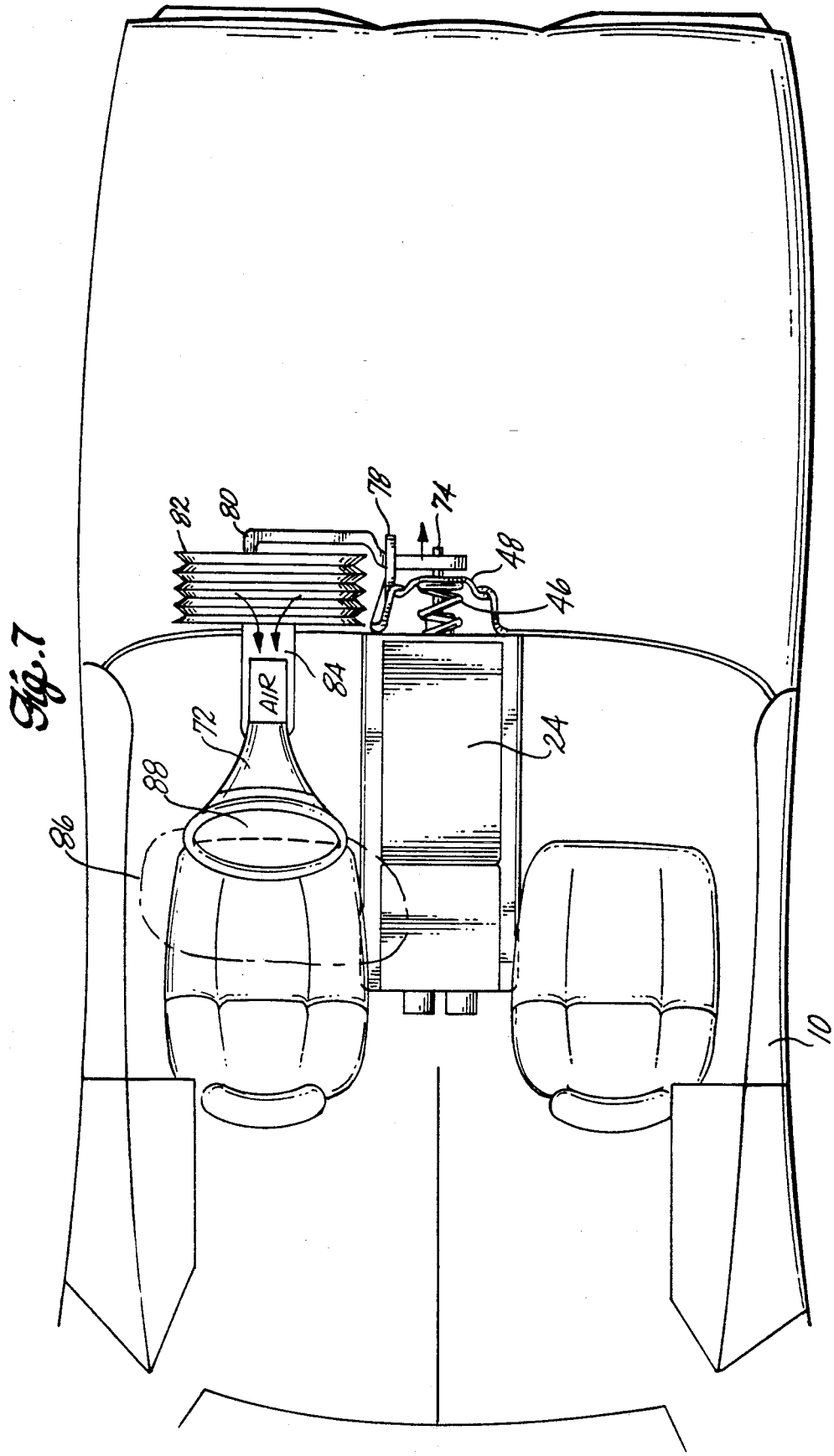

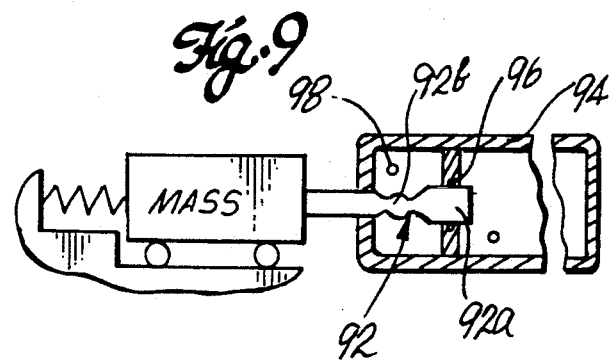
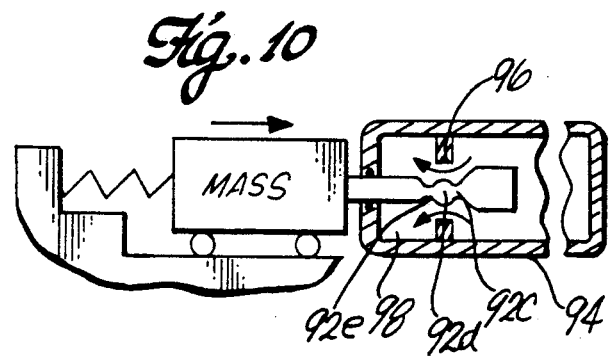
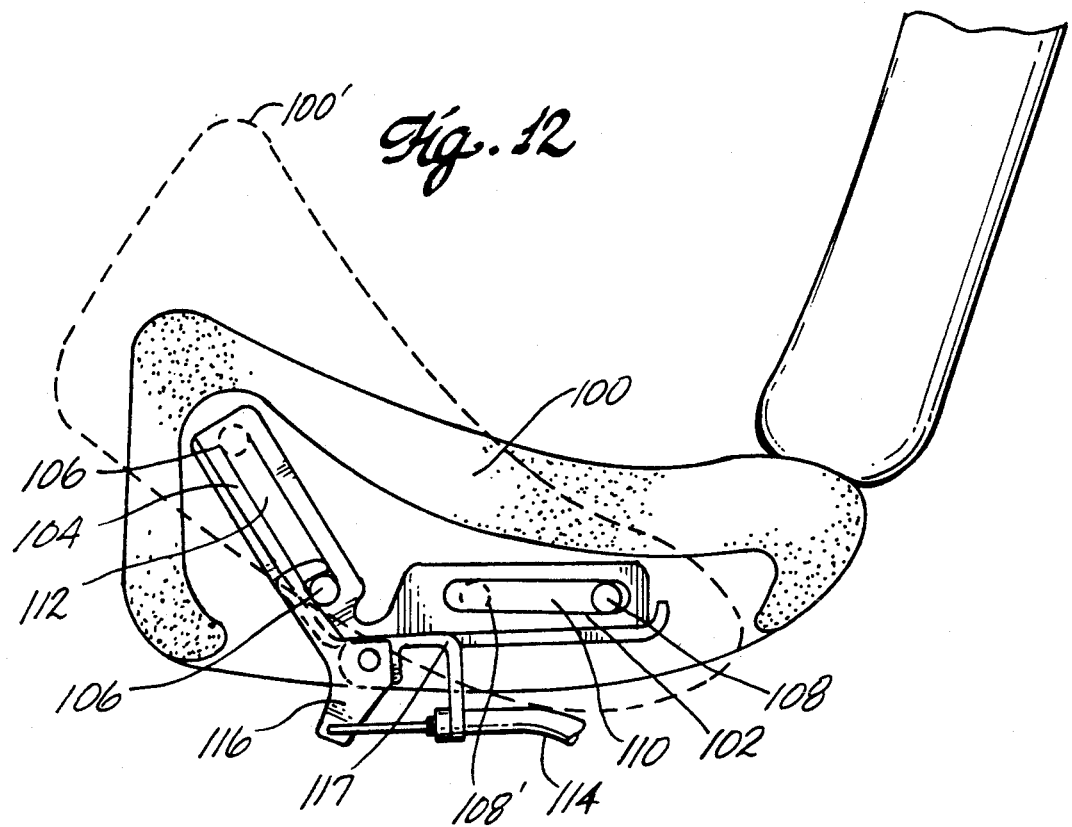

INERTIAL MASS SAFETY SYSTEM ACTIVATION FOR PERSONAL VEHICLES

BACKGROUND OF THE INVENTION

1. Field of the Invention

The present invention relates generally to safety systems for vehicles to enhance occupant protection during a crash. The invention specifically relates to activation of crash safety systems employing kinetic energy generated by an inertial mass constrained for movement within the vehicle and released by impact forces.

2. Description of the Prior Art

Crash safety in automobiles and other highway vehicles is a continuing area of concern for vehicle designers. Present vehicles employ a wide array of safety devices including seat belts, shoulder harnesses, air bags, and energy-absorbing collapsible structures.

Seat belt restraining systems including inertia reels and other devices for locking or tensioning the seat belt during a crash. Present designs employ position actuators, propellant driven turbines, or similar systems actuated by acceleration sensors to reduce slack or impose tension on the seat belt shoulder harness system. In some configurations, belt webbing is played out at a controlled force through tensioning systems to decelerate the occupant under conditions of high crash loads. These systems require highly reliable sensing systems to detect crash accelerations and require separate energy sources such as propellant charges or the like for operation.

Similarly, air bags are being employed in numerous vehicles for added occupant safety. Present air bag systems require sensors for detecting crash accelerations and propellant cartridges or other stored energy systems to inflate the bag upon actuation.

To obtain efficiency from common control and power source the subsystems of conventionally powered vehicles may be grouped and centrally located on a pallet within the vehicle. The subsystems such as hydraulic pumps and actuators for power steering, air conditioning systems, electronics such as stereo and mobile telephones which require electrical or supplemental power not driven directly from the drive train of the vehicle may be aggregated in such a system.

Additionally, alternatively powered vehicles are presently being designed and entering the consumer arena based on demand for clean, non polluting, non petroleum energy based transportation. Electric vehicles are becoming a viable alternative to gasoline or other petroleum based internal combustion engine vehicles. Vehicles employing hybrid systems of partial battery and partial internal combustion, fuel cell or other energy systems are also undergoing research and development.

Each of these alternative systems employs, as a portion of its system, components which are heavy masses that impart little mechanical torque or other forces requiring rigid constraint within the vehicle. It is desireable to employ the inertial mass in these alternative systems as an enhancement in the activation and operation of safety systems within the vehicle to reduce the cost and complexity while increasing the reliability of those systems.

SUMMARY OF THE INVENTION

The present invention employs a dense mass, such as a pallet containing the grouped subsystems for a conventionally powered vehicle or the battery pack in an electric vehicle, to provide crash sensing and energy for activation of safety systems within the vehicle. The mass is situated in the vehicle in a first constrained position. The mass is moveable under crash accelerations, in at least one axis, from the constrained position through a range of motion to a displaced position. The mass is held in the constrained position by resilient means such as a biasing spring or other means fixing the position of the mass which is overcome by an acceleration greater than a predetermined value of the mass in the at least one axis, constituting a crash load. Motion of the mass, from the constrained position, provides physical sensing of the crash and the motion of the mass provides kinetic energy for activation of safety systems. The means fixing the position of the mass may incorporate a damping means or a restraint having plastic yielding allowing motion of the mass.

The mass provides an inertial body which reacts to crash forces with predictable motion similar to the motion of the occupants for which protection is sought. The present system acts as an analog computer for determining the force and acceleration imposed on the occupants. Ideally the mass moves only under inertial forces and due to its centralized location within the vehicle is consequently unaffected by actual deformation forces imposed on the vehicle by the crash. Motion inducing systems mechanically coupled to the mass are actuated by the motion of the mass to reposition impact surfaces within a passenger compartment to reduce the distance of the impact element from the passenger, thereby reducing the velocity attained by the passenger before striking the surface while undergoing crash acceleration.

Energy from motion of the mass is also employed for impact prevention devices to constrain occupant motion.

Motion of the mass deactivates vehicle operating systems such as high voltage electrical power through physical disconnection, or circuit interruption to reduce shock and fire hazards.

Finally, inertial compensation by motion of the mass interacting with the resilient constraint, provides energy absorption from the crash, thereby assisting in reducing structural deformation of the vehicle required to absorb impact energies.

DESCRIPTION OF THE DRAWINGS

The present invention will be more clearly understood from the following detailed description and accompanying drawings, wherein:

FIG. 3 illustrates an embodiment of the present invention shown in a side cut-away view of a battery powered vehicle wherein the mass comprises the battery pack centrally mounted in a console;

FIG. 5 illustrates interconnection of the mass with a first impact prevention means comprising a seat belt and shoulder harness;

FIG. 6 is a front view of the vehicle including the present embodiment of the battery pack and seat belt tensioning means;

FIG. 7 illustrates a top view for an embodiment of an actuation for an air bag impact prevention system;

FIG. 9 illustrates a valving system for actuation of an air bag system in response to motion of the mass;

FIG. 10 illustrates the system of FIG. 9 activated during a crash and providing inflation gas in a predetermined flow profile based on valve geometry;

FIG. 17B is a top view of the actuator arm of FIG. 17A;

DETAILED DESCRIPTION

Figure 1:
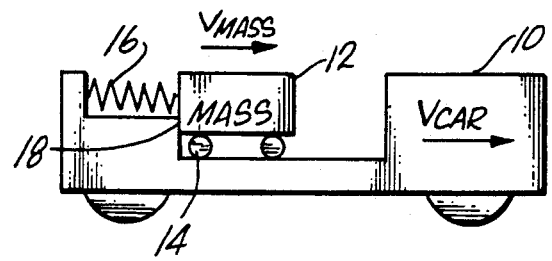
FIG. 1 is a schematic representation of a side view of the vehicle demonstrating the mass in the constrained position.

Referring to the drawings, FIG. 1 demonstrates schematically the basic elements of the present invention. A personal vehicle 10 which may be conventionally or alternately powered incorporates a mass 12 which is mounted in the vehicle on bearings 14 or other means permitting relative motion between the mass and the vehicle. The mass is constrained within the vehicle in the present embodiment by a bias spring 16 which constrains the mass in a first position and a bumper 18 which restrains the mass in opposition to the force of the spring.

Figure 2:
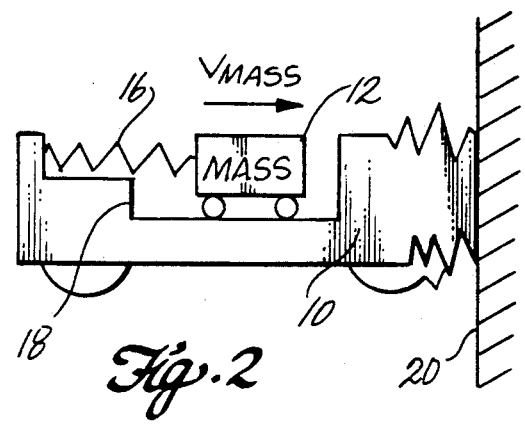
FIG. 2 schematically illustrates the alternatively powered vehicle undergoing crash loads with the mass in motion and the resilient means undergoing extension.

The reaction of the mass and the vehicle under crash accelerations is demonstrated schematically in FIG. 2. A barrier 20 has been impacted by the vehicle causing deformation of the vehicle and associated rapid deceleration. The mass 12 acting under the inertial forces present in the crash is displaced from the restraining bumper in opposition to the force imposed by the constraining bias spring. The central location of the mass in the vehicle and its movable mounting allows the mass to react inertially without direct interference by forces of the crash including the deformation of exterior portions of the vehicle. As a minimum, the deformation of the vehicle in the area surrounding the mass is designed to occur late in the crash sequence. The motion of the mass mirrors motion of a occupant induced by the crash decelerations.

A first embodiment of the invention incorporated in an electrically powered vehicle is shown in FIG. 3. The mass of the present invention in this embodiment comprises a battery pack 22 mounted in a central console 24 between the occupant seats in the vehicle. As best seen in FIG. 4A the battery pack comprises multiple conventional batteries 26 having interconnections 28 and an insulated box 30 contains the batteries which are electrically isolated by a battery separator 32. Incorporated in the sides of the battery box are linear bushings 34 which are captured in battery rails 36 as best seen in FIGS. 4E and 4F. The battery rails are attached to the frame of the vehicle with battery rail yokes 38 as shown in FIG. 4F. The battery box linear bushing is constrained within the battery rail which, in the embodiment shown, comprises a metal C channel having a plastic race 40 integrally received in the channel intermediate the bushing and channel providing a low friction bearing surface for the bushing.

Figure 4D:
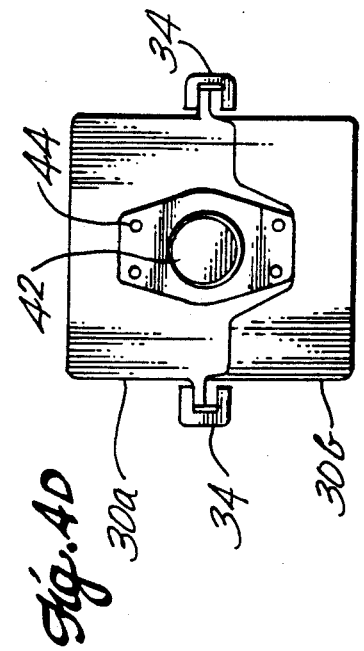
FIG. 4D is a front view of the battery pack showing the constraint spring support boss.
Figure 4A:
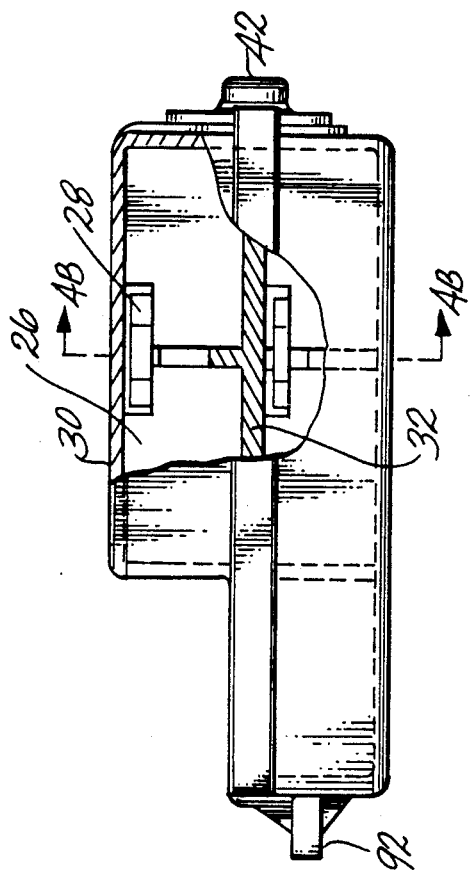
FIG. 4A provides a side detailed view partially cut-away to demonstrate the construction of the battery pack.
Figure 4B:
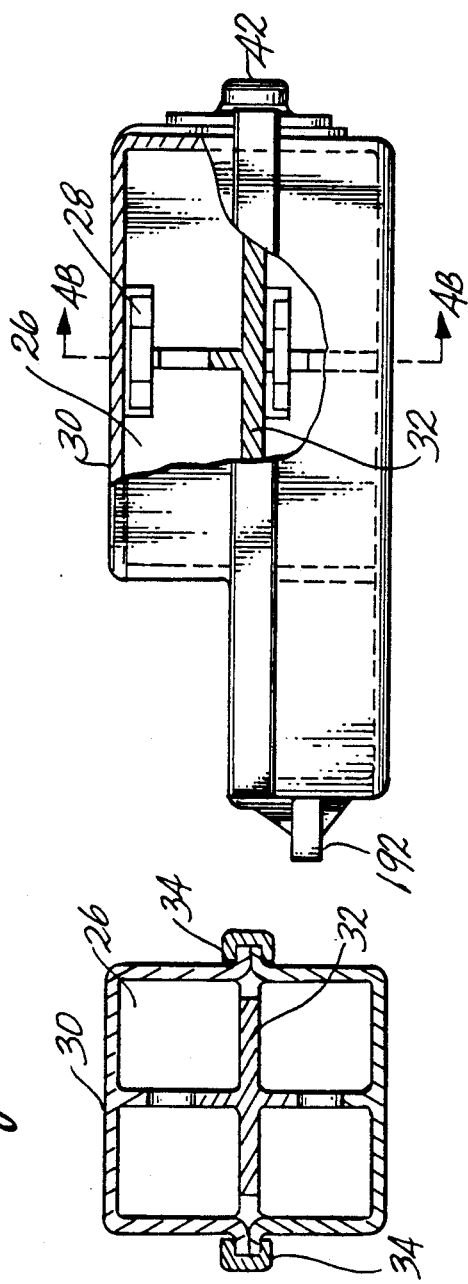
FIG. 4B is a rear cut-away view along lines 4B—4B.

A boss 42 best seen in FIGS. 4A and 4D is attached to the front of the battery box employing rivets or other standard fastening means 44. A spring 46 engages the boss, as seen in FIG. 3, resiliently connecting the mass of the battery box to the frame of the vehicle through a battery cup 48 mounted in the firewall of the vehicle 50. The spring resiliently urges the battery box rearward in the vehicle causing the rear termination of the linear bushing on each side of the box to engage the battery rail yoke which restrains the battery box in the rest position.

A frontal impact of the vehicle will result in motion of the battery forward against the spring. Compression of the spring which may be tailored to deform at a predetermined rate allows a range of motion of the battery designated 52 for illustrative purposes in FIG. 3. The crash acceleration imposed on the vehicle will result in relative acceleration between the vehicle and battery box mass. The spring engaging the boss on the battery box may be tailored to provide specific force resisting motion of the battery box dependent on the crash acceleration and relative position of the mass during the crash. A severe crash imposing high deceleration loads on the vehicle will therefore result in greater movement of the mass. The movement of the mass provides kinetic energy and physical motion for actuation of safety systems employed to prevent impact of the occupant with interior surfaces on the vehicle and alternative safety devices which reposition impact surfaces within the vehicle to reduce the velocity with which the occupant strikes the surface during a crash.

I. Impact Prevention Systems

A first embodiment of an impact prevention device has incorporated in the present invention is shown in FIG. 5. The objective of the impact prevention device is to physically restrain the motion of the occupant in the vehicle to preclude contact with interior surfaces of the vehicle which may cause injury. The motion of the mass provides actuation motion for the impact prevention device.

The seat belt and shoulder harness 54 is connected at one end to the frame of the vehicle in a conventional manner described subsequently. In the present embodiment the buckle system 56 engaging the second end of the seat belt/shoulder harness is positioned adjacent the center console housing the battery box mass. A cable 58 extends from the buckle assembly around a pulley 60 rotatably attached to the console or nonmovable portion of the seat attachment and is connected to the battery pack. Forward motion of the battery places tension on the cable drawing the cable around the pulley and tensioning the seat belt and shoulder harness into close contact with the occupant preventing impact of the occupant on the interior surfaces of the vehicle.

Figure 6A:
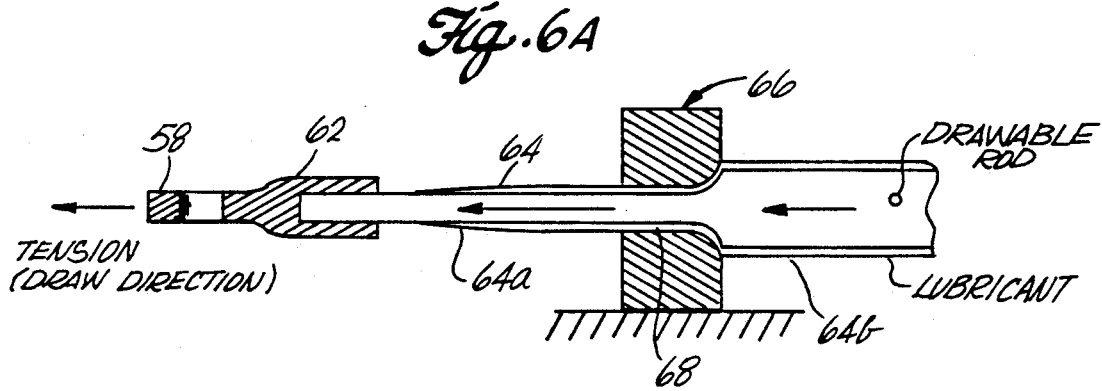
FIG. 6A illustrates an embodiment of an energy compensation device for tensioning of the seat belt system of FIG. 5, while precluding forces in the restraining system from exceeding a predetermined value.

In the embodiment of FIG. 5 the cable is attached to the battery box through a cable tensioner clamp 62 which unites the cable with a tensioner rod 64. The tensioner rod extends through a die which is attached to the battery box. As best seen in FIG. 6A the tensioner rod incorporates a first portion 64A having a diameter received through the diameter of the aperture in the die 68. A second portion of the tensioner rod 64D opposite the die from the cable attachment to the tensioner rod comprises a plug of greater diameter of malleable material which may be drawn through the die providing energy absorption to apply a calibrated force to the cable, and hence seat belt/shoulder harness, relative to the velocity and displacement of the battery box mass.

As shown in FIG. 5 a tensioner stop 70 is employed to preclude extraction of the tensioner rod from the die. In the embodiment shown in FIG. 5 the pulley is positioned for alignment of the cable tensioner clamp, tensioner rod and tensioner die allowing axial motion of the tensioner rod through the die.

Attachment of the first end of the seat belt/shoulder harness to a frame attachment 55A and inertia reel 55B is best seen in FIG. 6. Those skilled in the art will recognize that the seat belt/shoulder harness may be a single webbing strap wherein the second end of the seat belt/shoulder harness comprises a lapping of the strap web through a roller assembly on the seat belt buckle. Also the energy absorbing means alternatively can be placed at the frame attachment and inertia real of the seat belt and shoulder harness.

Figure 8:
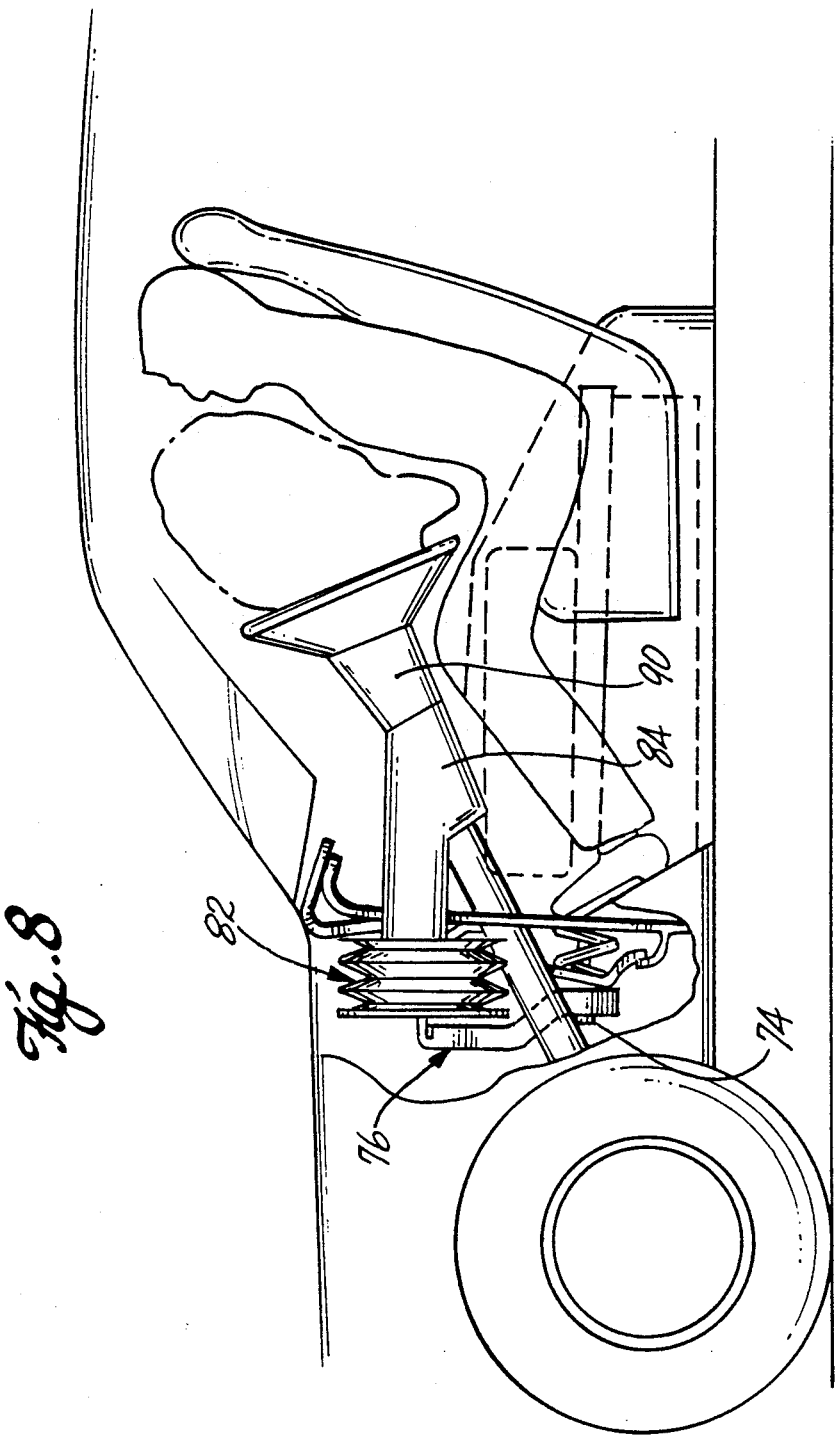
FIG. 8 illustrates the system of FIG. 7 activated under crash loads.

An embodiment of the invention employing a second impact prevention device is shown in FIG. 7. An air bag mounted in the steering column 72 is activated by motion of the battery box mass. A lever push rod 74, concentrically mounted within the spring coils and attached to the spring boss in the embodiment shown, is attached to a bellows lever 76. Motion of the battery box mass under frontal impact forces the lever push rod forward rotating the bellows lever about a pivot yoke 78 forcing the bellows contact 80 of the lever against bellows 82. Motion of the bellows lever compresses the bellows forcing air from the bellows through an interconnection channel 84 in the steering column inflating the air bag 86 (shown in phantom) from its container in the steering hub 88. As best seen in FIG. 8, the interconnection of the bellows with the steering column comprises a conduit extending from the bellows forward of the firewall to the steering column and encircling the steering column to provide air through a collar 90 to the air bag. Suitable rotatable sealing means are employed for pressure integrity in the assembly.

Actuation of the air bag is accomplished directly by motion of the battery mass. Consequently the present invention alleviates the requirement for complex acceleration sensors for detecting crash loads required present air bag systems. The motion and kinetic energy of the mass also provides the energy and motion for compression of the bellows.

As an alternative to the bellows system described with regards to FIGS. 7 and 8, a pressurized gas reservoir may be employed as disclosed in FIG. 9 for inflation of the air bag. Motion of the battery box mass is employed to actuate a spool valve 92 which is employed to contain pressurized gas in a pressure bottle 94. The spool valve in the embodiment shown is directly connected to the push rod attached to the mass. Forward motion of the mass moves the spool valve through an orifice 96 until the sealing portion of the valve 92A clears the orifice. A throat portion of the valve 92B is positioned in the orifice by motion of the mass allowing pressurized from the pressure bottle to escape into a manifold 98 attached to the conduit 84 providing gas to the air bag.

The actuated position of the spool valve demonstrated in FIG. 10 regulates the flow of gas from the pressure bottle to the manifold based on position of the mass. In the embodiment shown initial displacement of the mass places a minimum diameter portion 92C of the spool valve in the orifice allowing maximum gas flow for initial inflation of the bag. As forward motion of the mass continues a restricted flow portion 92D of the spool valve enters the orifice restricting the flow to provide a substantially constant flow for inflation of the air bag. In a particularly severe crash as pressure in the gas storage bottle is depleted and motion of the mass continues a second minimum diameter portion 92E of the spool valve enters the orifice again allowing maximum gas flow to the air bag. Tailored shaping of the spool valve for desired gas flow rates and pressures based on position and velocity of the motion of the mass are employed.

Figure 22:
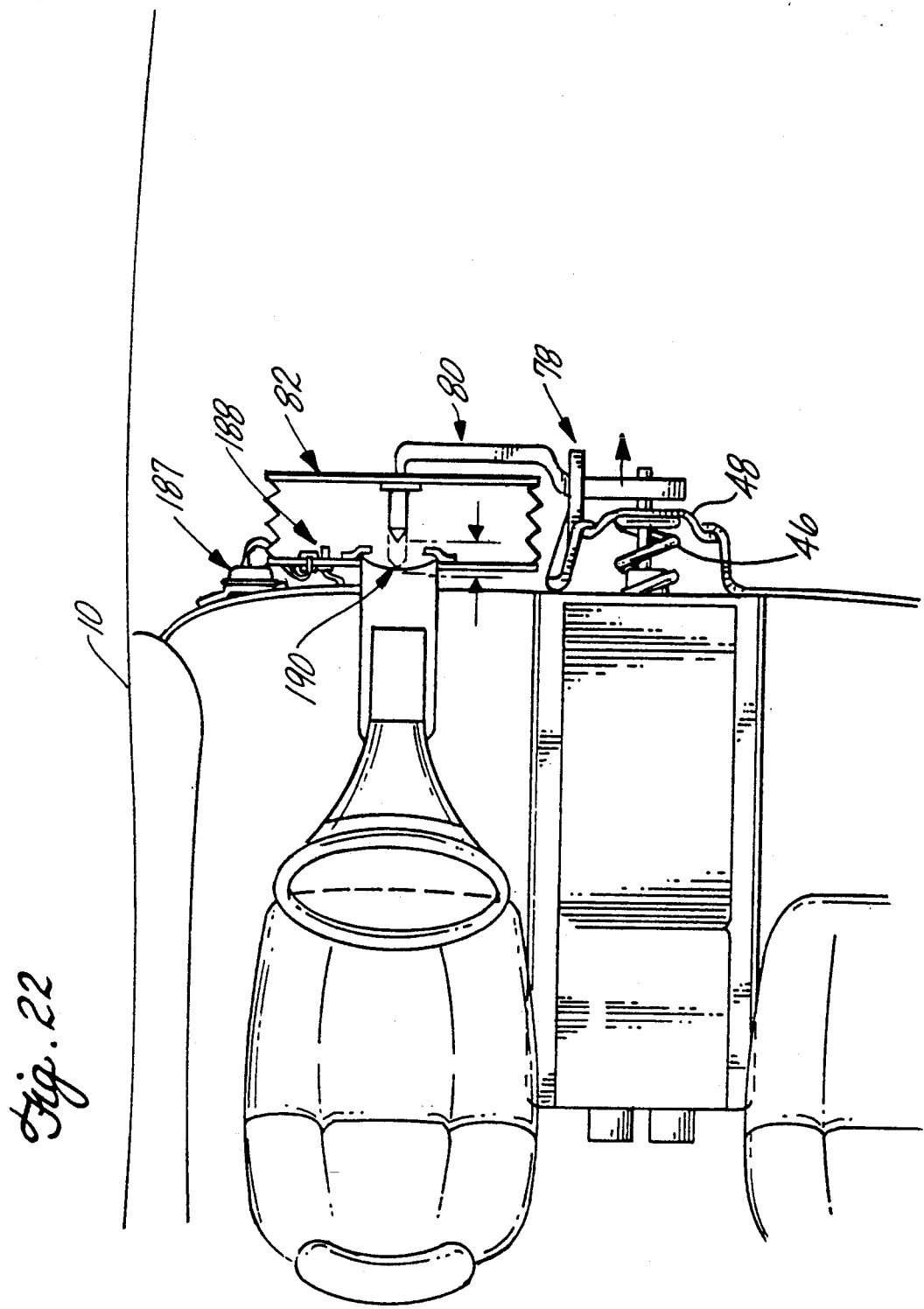

An alternate embodiment of the invention employing an airbag is shown in FIG. 22. The stroke and size of the bellows required for the inflation of the airbag is reduced through the use of a pressurization pump 187 which maintains a pressure above atmospheric to pre-pressurize the bellows. A pressure sensor 188 senses the pressure in the bellows and activates the pump as required to maintain the desired pressure. This additional pressure allows reduction in size of the bellows to inflate the airbag upon actuation. A diaphragm 190 seals the pressurized bellows from the gas conduit to the airbag. Under crash loads, the motion of the lever push rod, actuated by the mass, depresses the bellows contact to compress the bellows. A plunger 192 attached to the bellows contact, as shown in the drawings, is driven into the diaphragm to pierce it, thereby releasing the pressure of the bellows into the conduit to inflate the airbag.

A system employing motion and kinetic energy of the mass through a bellows, stored gas in a pressurized bottle and use of motion of the mass for actuation of pyrotechnic or other devices for gas bag deployment comprises an alternate embodiment of the invention.

Figure 11:
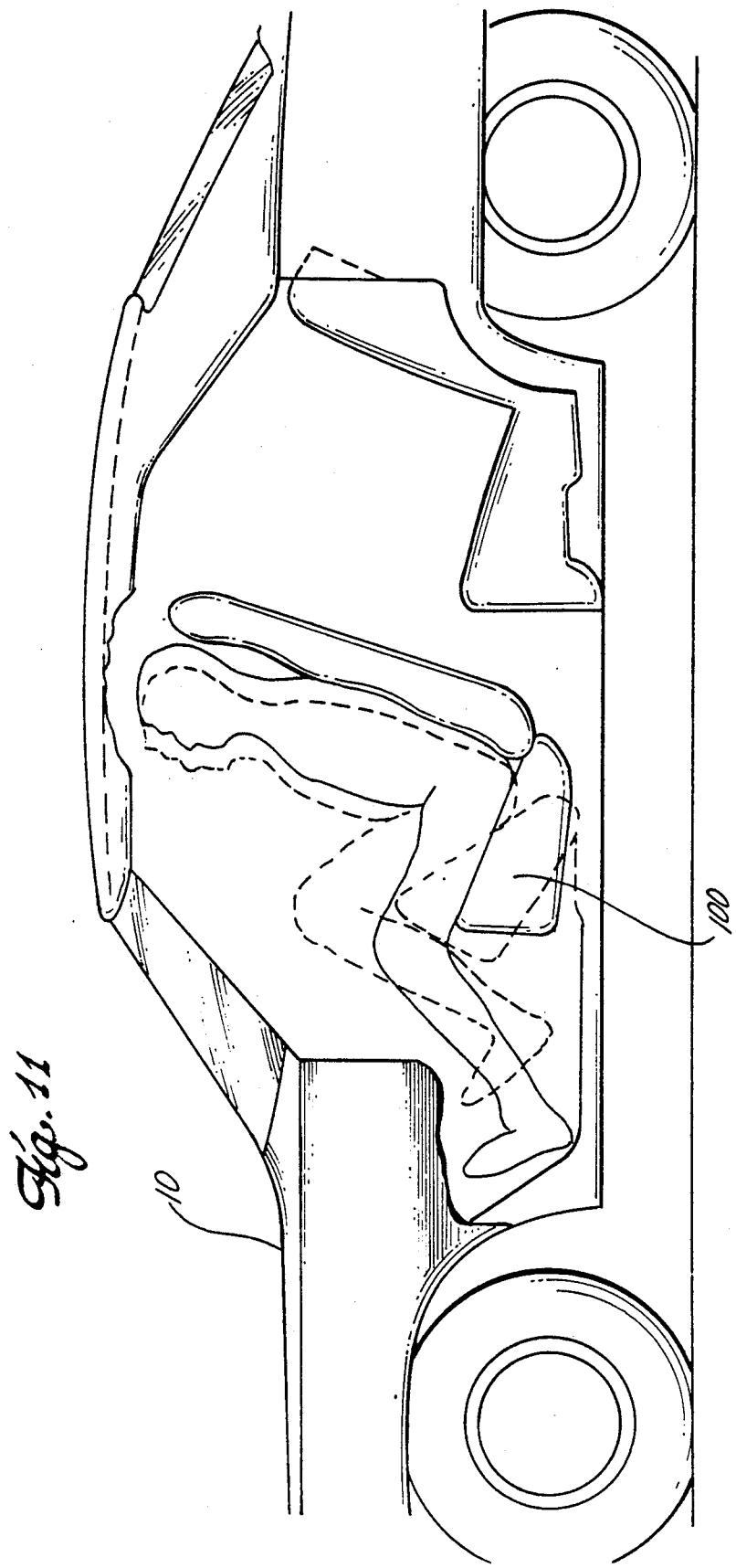
FIG. 11 illustrates a third impact prevention system actuated by the mass and comprising a seat rotation system.

Turning now to FIG. 11 a third impact prevention system activated by the motion of the mass is disclosed. Repositioning of a seat base 100 from a normal driving position to a displaced energy arresting position 100' (shown in phantom) is initiated by motion of the mass. As shown in detail in FIG. 12 a horizontal seat guide 102 and a Vertical second axis seat guide 104 provide support for the seat base. Each seat guide contains a slot receiving a guide bushing 106 and 108 in the normal position. The seat guide rests at the aft position in the slots 110 and 112 of the horizontal and off axis seat guides respectively. Under crash loads the seat guide bushings translate in the slots to the forward end of the slot. The off axis relationship of the two seat guides creates a rotation of the seat base with the seat guides shown in the forward crash position in phantom as 106' and 108'. Rotation of the seat inhibits forward motion of the occupant thereby assisting in prevention of impact on internal surfaces of the vehicle.

In the embodiment shown actuation of the seat base is accomplished through a control cable 114 actuated by motion of the mass. A pivoting latch 116 engages the guide bushing on the off axis seat guide to preclude motion of the seat in normal operation. The sheath of the cable is constrained by a cable mount 117 attached to a portion of the seat base frame fixed relative to the crash responsive portion of the seat. Motion of the battery pack mass under crash loads tensions the control cable assembly rotating the latch to free the seat guide allowing acceleration forces of the crash to urge the seat base forward and upward as guided by the guide bushings to achieve the desired rotation.

Active operation of the seat base is accomplished as an alternate embodiment by direct connection of the cable through pulley attachments to induce motion of the seat base directly through extraction of the cable or by preloading the seat base with a spring or other energy storing means.

Figure 12:
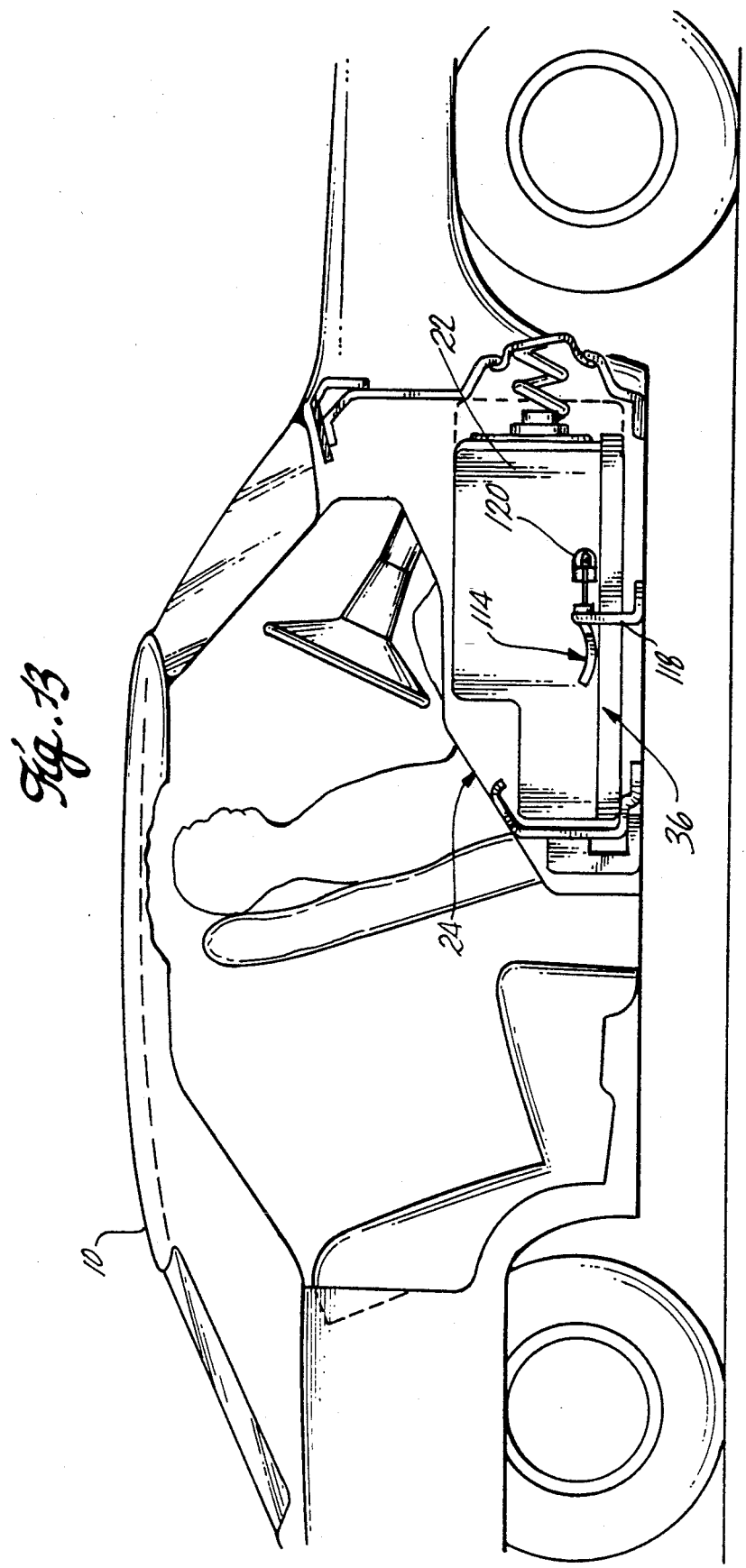
FIG. 12 illustrates the seat rotation system of FIG. 11 activated during crash loads.
Figure 13:
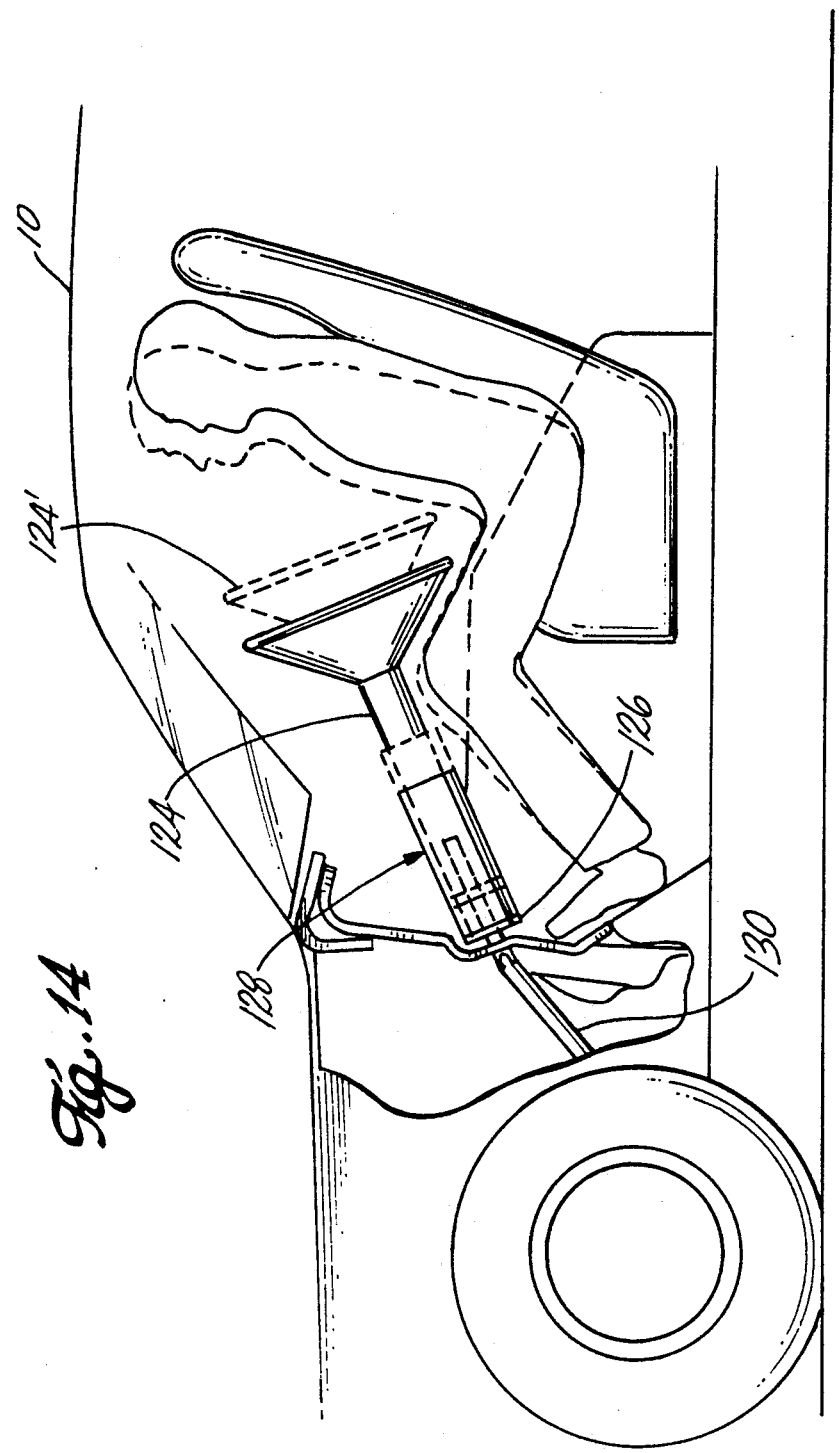
FIG. 13 illustrates the cable actuation system and attachment to the battery pack of the present embodiment for actuating the seat rotation system.

Attachment of the control cable to the battery box mass is best seen in FIG. 13. The control cable sheath is constrained by a cable mount 118 attached to the frame of the vehicle. The control cable is attached to the battery box mass through cable attachment 120. Forward motion of the mass under crash loads extracts the cable from the sheath resulting in rotation of the latch as shown in FIG. 12.

II. Repositioning of Impact Surfaces

Injuries to occupants of a vehicle during a crash may be minimized if the velocity with which the occupant strikes interior surfaces of the vehicle is reduced. Repositioning of such surfaces in closer proximity to the occupant in normal usage of the vehicle is impractical. However, during a crash sequence rapid movement of the surfaces to a position near the occupant prior to significant velocity buildup by the occupant's body is desirable. The present invention provides ideal sensing and actuation for such systems. The mass of the battery box, or other appropriate mass for conventional vehicles, provides motion and kinetic energy which is translated through mechanical hydraulic pneumatic or other linkage in the present invention to rapidly move surfaces of likely impact closer to the occupant.

Figure 14:
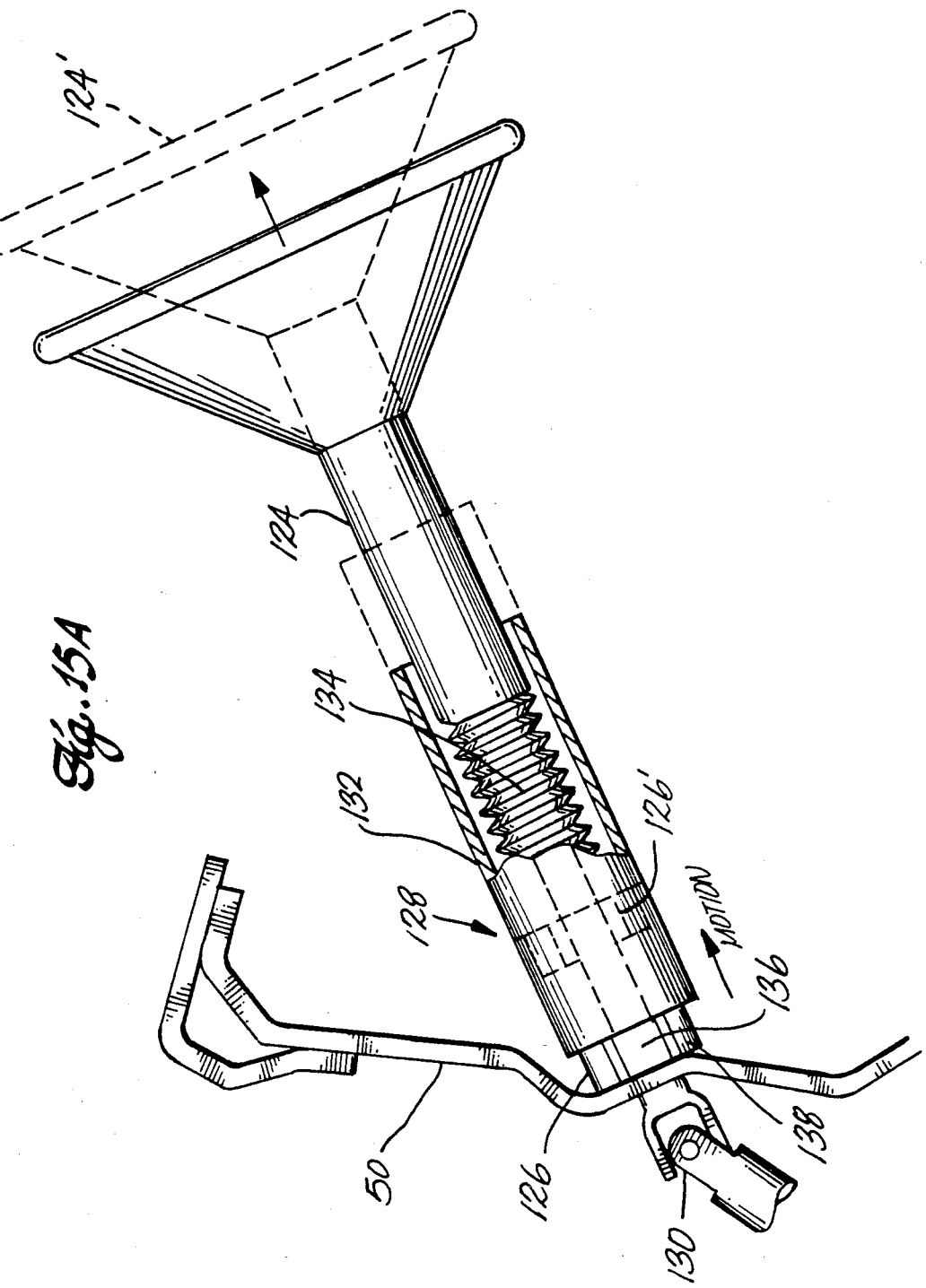
FIG. 14 illustrates a first impact repositioning system actuated by the mass comprising a steering column motion system.

A first system employed in the present invention is shown in FIG. 14. Collapsible steering columns have been known in the industry for many years. However, the fixed positioning of the steering column at comfortable driving arrangements for the occupant allows significant velocity buildup of the occupant's upper torso during crash accelerations prior to impacting the steering column with subsequent energy absorption by collapse of the column. The steering column 124 of the present invention is moved under crash loads by an actuator lever 126 to a displaced position 124' (shown in phantom). This motion positions the steering wheel significantly closer to the occupant thus reducing the velocity buildup of the occupant prior to impacting the wheel. Impact of the occupant on the wheel actuates a collapsible energy absorption means integral with the steering column. Conventional linkage 130 extends from the steering column operation of vehicle steering.

Figure 15:
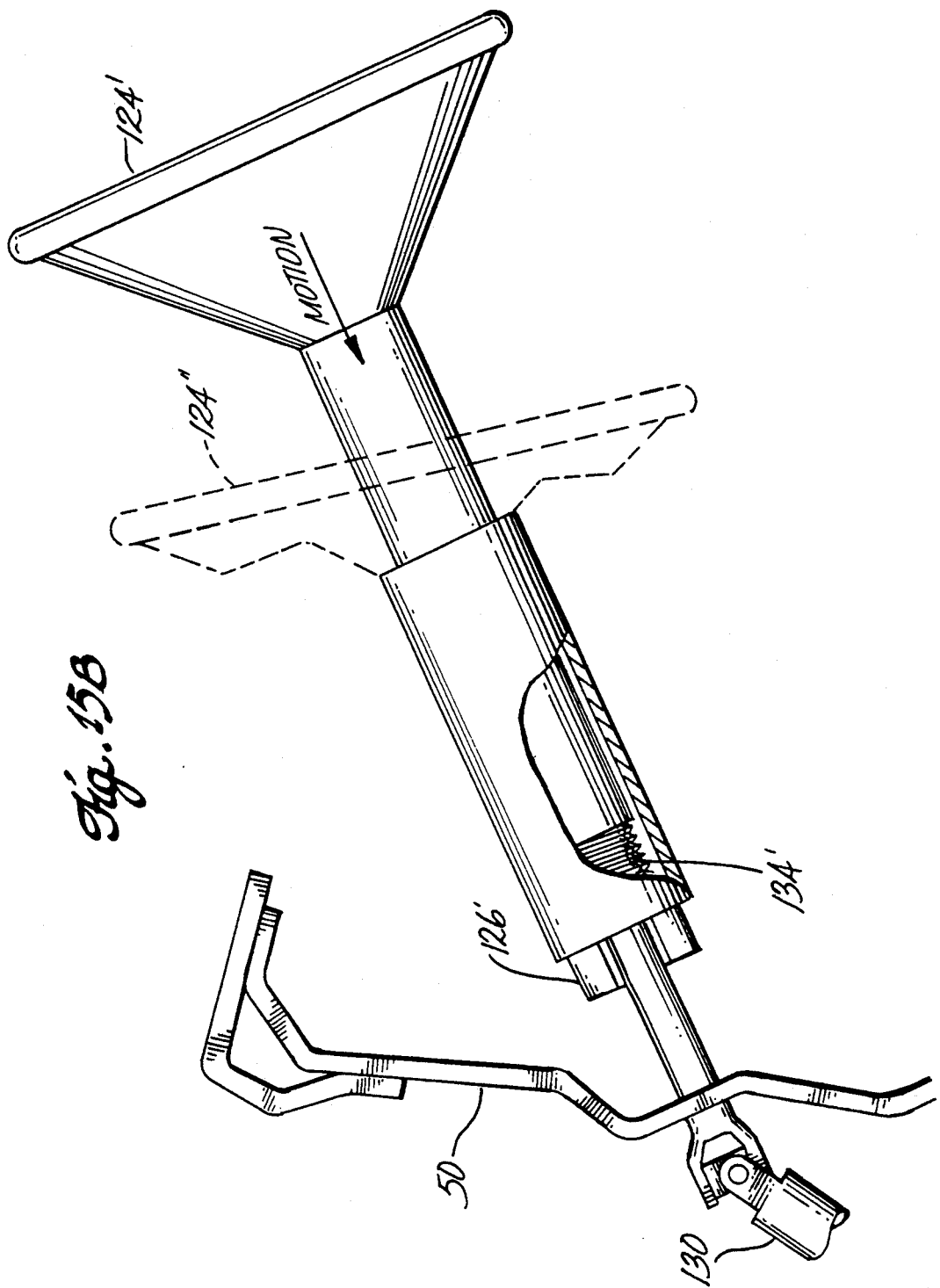
FIG. 15A is a detailed side view illustrating the steering column in the normal position and as extended (phantom) under crash loads.
FIG. 15B is a detailed side view showing the collapsibility of the steering column after extension during a crash.

Details of the steering actuation and configuration are shown in FIG. 15A and 15B. The steering column in the embodiment shown includes a torque sleeve 132 which houses the mechanism for energy absorption and collapse of the collapsible section of the column. The torque sleeve provides physical protection for the collapsible portion and enhances transfer of steering forces through the column. A shock absorption system 134 of standard design may be employed. It should be noted that due to the advantages of the present invention, reducing velocity of impact by the occupant on the steering column, the complexity of the energy absorbing system may be reduced. A central steering shaft 136 extends from the steering column for attachment to the steering linkage in the embodiment show in the drawings. The actuator lever incorporates a horseshoe yoke 138 which engages the central rod of the steering column and the base of the torque sleeve. Motion of the actuator lever from its first at rest position to a displaced position 126' (shown in phantom) urges the steering column from its initial position to the maximum extension position. Motion of the steering column is completed, by design, before acceleration of the occupant induces contact.

Collapse of the steering column under crash loads is demonstrated in FIG. 15B. From the maximum extended position 124', the steering column is collapsed to an impact position 124" (shown in phantom) The collapsing energy absorption mechanism of the steering column in shown in the collapsed position 134'.

Figure 16:
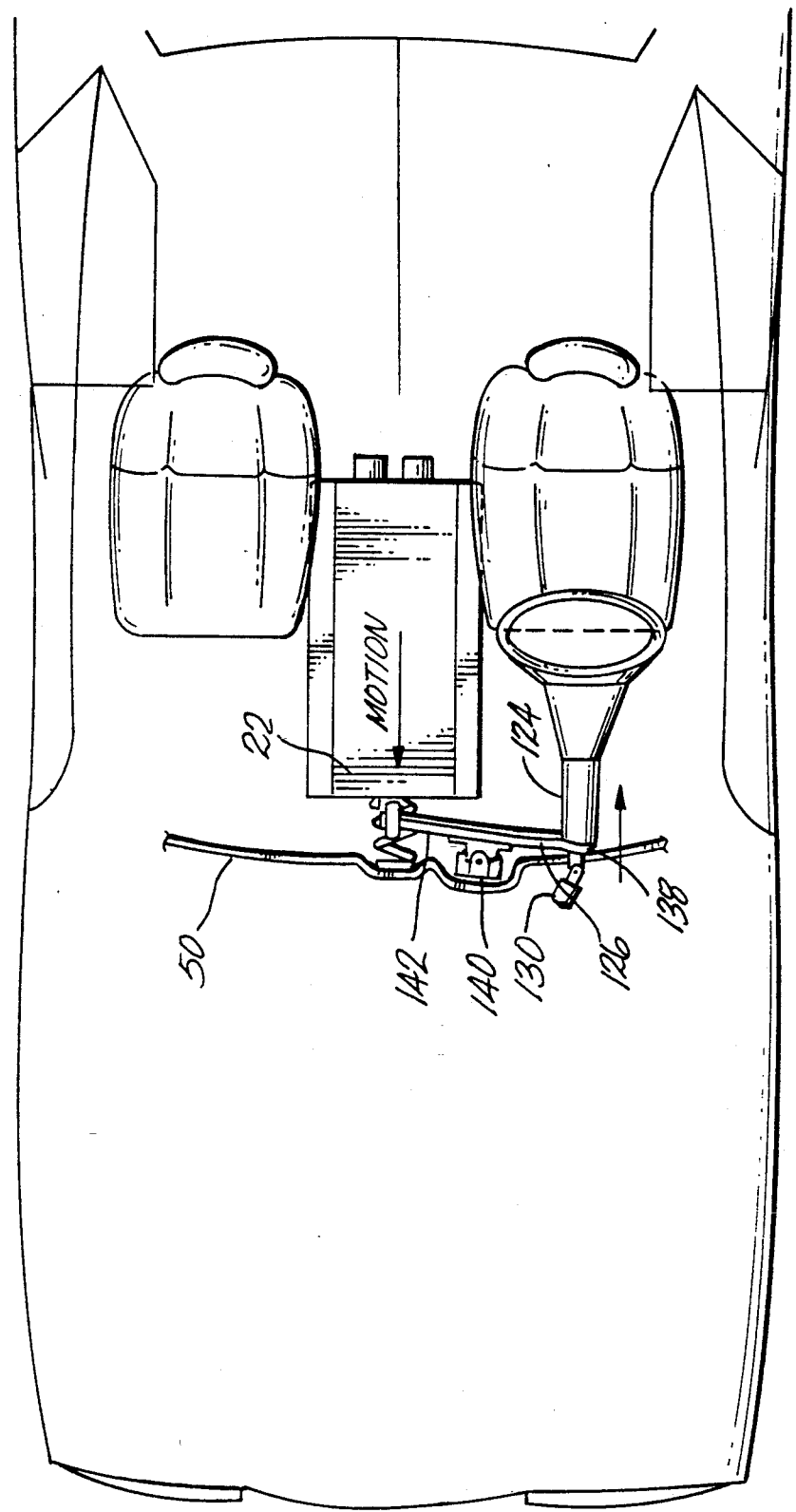
FIG. 16 is a detailed top view of the present embodiment showing the actuation system for the steering column extension acted upon by motion of the mass.

Operation of the actuator lever for repositioning of the steering column is shown in FIG. 16. The actuator lever is supported on a pivot bearing assembly 140 mounted to the firewall. An actuator arm 142 of the lever engages the battery box. Forward motion of the battery box under crash loads forces the actuator arm forward pivoting the actuator lever about the pivot bearing assembly and urging the horseshoe yoke rearward to reposition the steering column.

Details of the actuator lever assembly are best seen in FIG. 17A and 17B. In the embodiment shown in the drawings the pivot bearing assembly comprises a mounting bracket 144 having mounting bosses 146 containing axial apertures to receive a pivot pin 148. The pivot pin engages a pivot boss 150 on the actuator lever. Attachment of the pivot bearing assembly to the firewall is accomplished to align the axis of rotation for proper motion of the steering column from the normal to extended position. Those skilled in the art will recognize that angular positioning of the horseshoe yoke and actuator lever may be modified for various vehicle configurations to achieve proper clearance and mechanical advantage.

In the embodiment shown in FIG. 17A and 17B, the actuator arm terminates in a roller assembly 152 having a wheel 154 attached to the arm with a axle bolt 156. Plastic washers 158 inboard and outboard of the wheel engaging the arm and axle bolt respectively provide bearing surfaces for the wheel. The wheel of the roller assembly engages the battery box to provide a bearing for compensating angular differences in motion of the battery box and actuator lever. The actuator lever can also deform for further energy absorption by the steering column.

Figure 18:
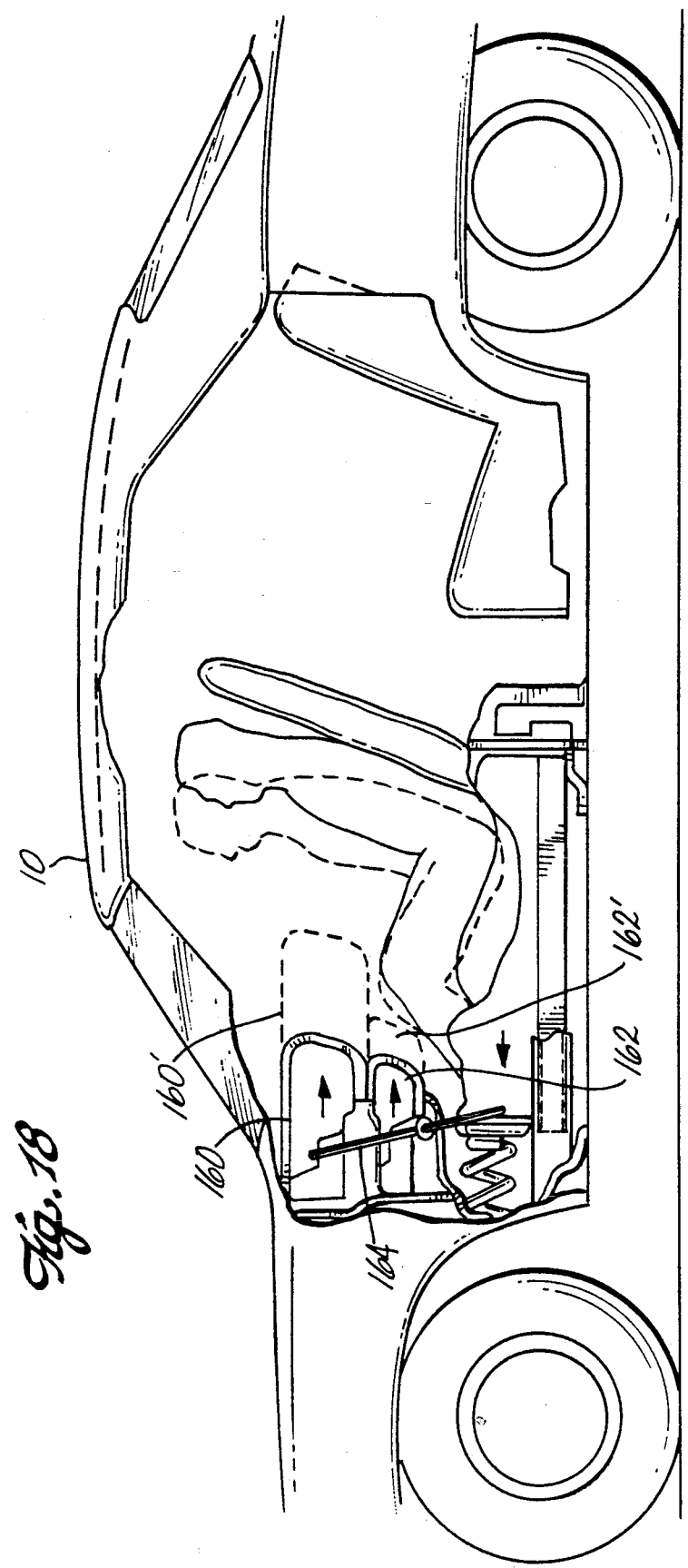
FIG. 18 is a cut-away side view of a second impact repositioning system actuated by the mass and comprising a moveable instrument panel and knee bolster system.

A second impact surface repositioning system employed in the present invention is shown in FIG. 18. In present vehicles, the instrument panel and knee bolster are arranged for sufficient occupant room during everyday use of the vehicle. During a crash the velocities obtained by the occupant prior to striking the instrument panel or knee bolster a crash may be excessive due to this positioning. The present invention repositions the instrument panel and knee bolster in closer proximity to the occupant during a crash, thereby reducing the velocity with which the occupant strikes the surface. Standard padding and energy absorption surfaces on the instrument panel and knee bolster enjoy improved performance when impact velocity of the occupant is reduced.

Figure 19:
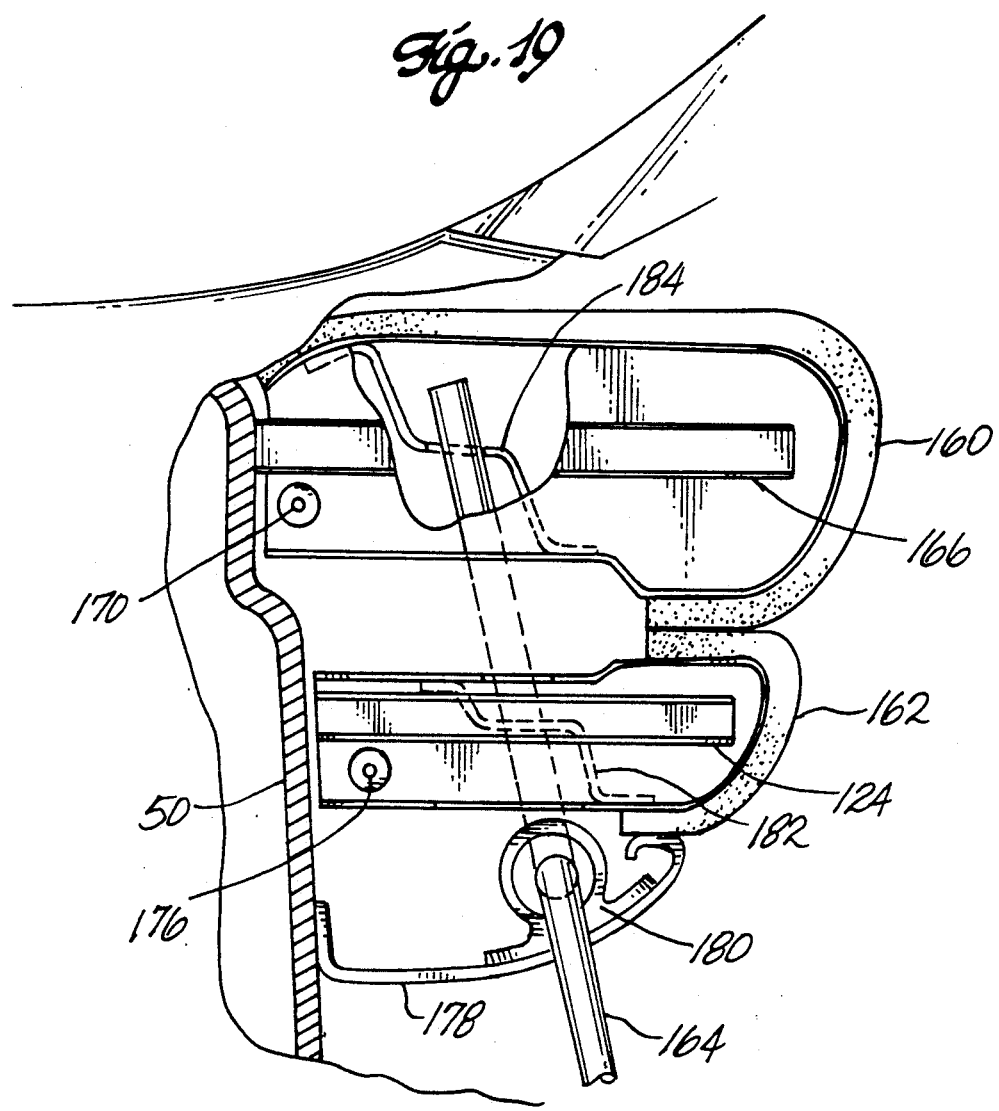
FIG. 19 is a detailed side cut-away of the moveable instrument panel and knee bolster with actuating rod assembly.
Figure 20:
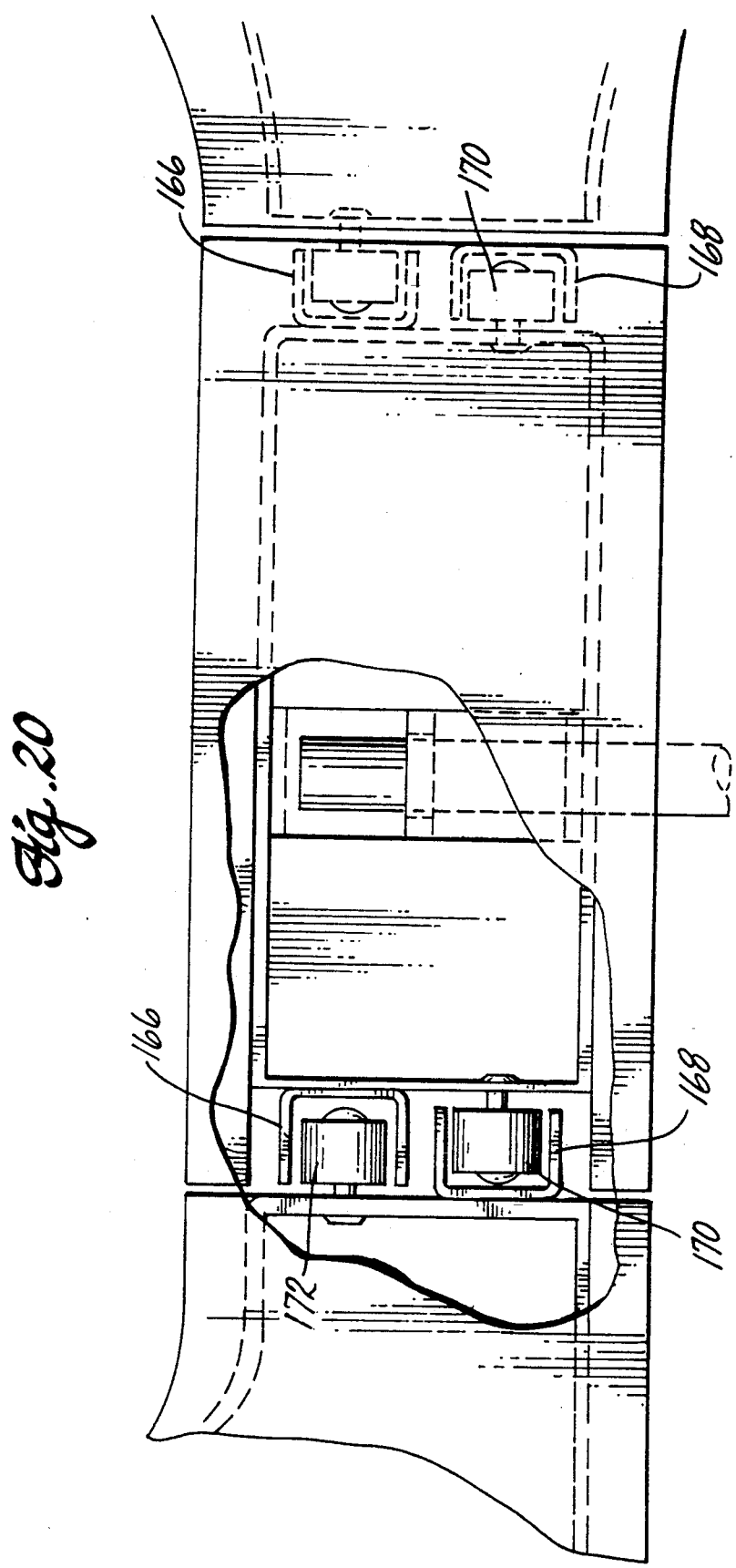
FIG. 20 is a front view of the instrument panel box construction demonstrating the stationary race and roller assemblies for motion of the panel.

The instrument panel 160 is repositioned in the present invention under crash loads to a crash position 160' (shown in phantom). Similarly, the knee bolster 162 is moved to an impact position 162'. Motion of the instrument panel and knee bolster is accomplished through an actuator rod 164, the details of which are best seen in FIG. 19. In the embodiment shown in FIG. 19, the instrument panel is mounted employing complementary race and roller systems. An instrument panel box race 166 is mounted to each end of the instrument panel as best seen in FIG. 20. A stationary race 168 is mounted to the frame of the vehicle on each side of the instrument panel. Roller assemblies 170 mounted to the instrument panel are engaged within the stationary race while second roller assemblies 172 mounted to the vehicle frame are engaged within the instrument panel box race.

Similarly, for the knee bolster, a knee bolster box race 174 and roller race assembly 176 are mounted on the ends of the knee bolster with complementary stationary races and second roller assemblies mounted to the frame of the vehicle for complementary attachment.

The actuator rod extends through the forward console base 178 engaging an actuator rod bearing assembly 180. The actuator rod bearing assembly may be implemented in a simple low friction ring constraining the actuator rod or with standard rotatable uniball bearings. The rod extends through the knee bolster and into the instrument panel box engaging knee bolster through a first rod holder 182 and the panel at a second rod holder 184. The lever action of the actuator rod in the embodiment shown greater motion for the instrument panel than the knee bolster thereby providing optimum positioning for reduced impact velocities of the occupant's upper torso on the instrument panel and legs and shins on the knee bolster. The actuator rod is also deformable to allow energy absorption of impact on the instrument panel and knee bolster by the occupant.

Figure 21:
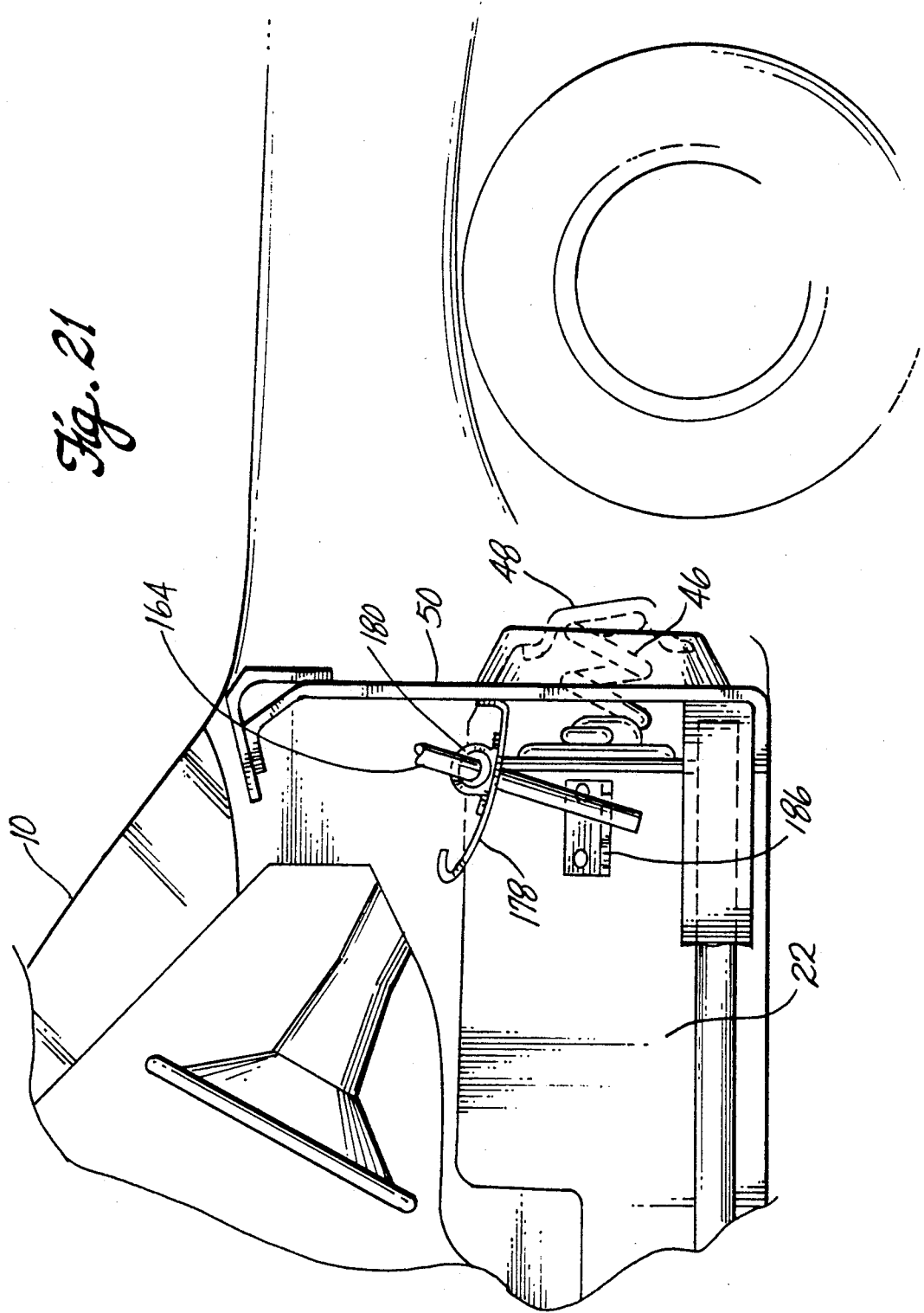
FIG. 21 is a side cut-away illustrating the actuator rod attachment to the mass; and, FIG. 22 is a top view of a combined bellows and pump driven pressurization system for an airbag.

Operation of the actuator rod is shown in FIG. 21. A rod flange 186 is attached to the battery case and rotatably receives a first end of the actuator rod. Forward motion of the battery box under crash loads urges the first end of the rod forward, thereby pivoting the rod in the bearing assembly 180 to reposition the instrument panel and knee bolster. Positioning of dual actuator rods on opposite sides of the battery box is employed to obtain a symmetric motion or the instrument panel and knee bolster for the driver side and passenger side of the instrument panel to accommodate differing configurations of the panel sides. Operation of the passenger side instrument panel and knee bolster system singly is employed to compensate for back of steering column absorption capability present on the driver side of the vehicle.

The present invention provides reliable automatic actuation of impact prevention and repositioning of impact surfaces for occupant protection during vehicle crash accelerations.

III. Power System Deactivation

Figure 4C:
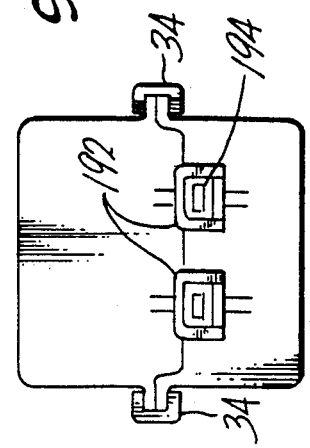
FIG. 4C is a rear view of the battery pack showing the connector terminals.
Figure 4E:
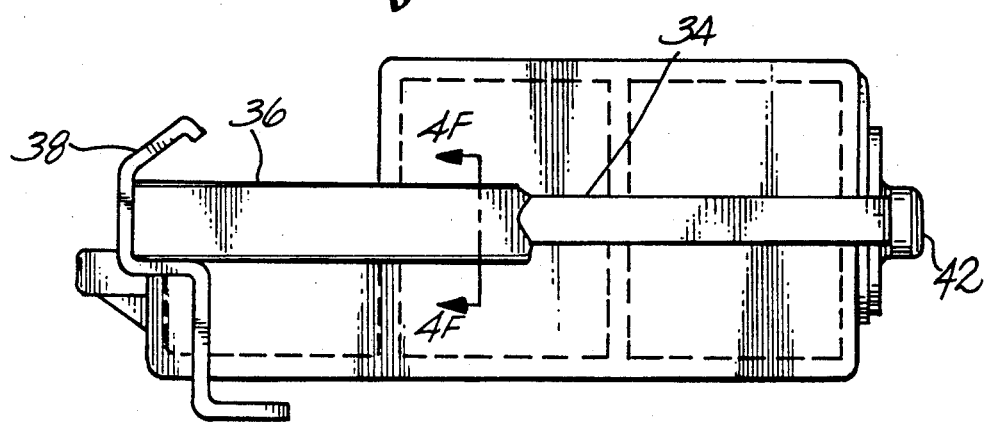
FIG. 4E is a side view of the mounting of the battery pack in rail yokes attached to the chassis.
Figure 4F:
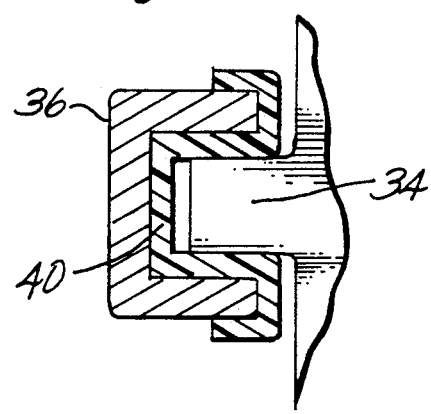
FIG. 4F is a sectional view of the linear bushing and attachment for the battery pack along line 4F—4F of FIG. 4E.

The present invention provides for positive deactivation of power in electrically powered vehicles such as the embodiment shown in the drawings. Referring to FIG. 3, battery box mating connectors 190 structurally mounted to the frame of the vehicle receive connector assemblies 192 on the battery box as best seen in FIG. 4A and 4C. Motion of the battery box under crash loads displaces the batters box forward disconnecting the terminals 194 of the connector assemblies from the mating connectors. Permanent deformation of the spring 46, latching of the mass or repositioning of the terminals in the connector precludes reconnection of the connectors post-crash after relaxation of the spring and neutral positioning of the battery box.

Repositioning of the battery box in a relaxed position after cessation of crash acceleration allows deactivation of the safety systems of the present invention except in severe crash conditions where major deformation of the vehicle precludes normal repositioning. This feature of the invention enhances occupant egress from the vehicle post-crash by repositioning instrument panel and knee bolster, steering column, and the tensioning set belt systems.

Combination of an airbag, as previously described, within the movable portion of the instrument panel or knee bolster provides additional occupant safety. Combined repositioning of the impact surface with inflation of the airbag causes reduced velocity of impact by the occupant allowing use of a smaller airbag.

Having now described the invention in detail as required by the patent statutes, those skilled in the art will recognize modifications and alterations for implementing the invention in specific embodiments. Those modifications and alterations are within the scope and intent of the present invention as defined in the following claims.

What is claimed is:

1. A safety system activation and energy supply device for personal vehicles, the device responsive to crash accelerations imparted on the vehicle and comprising:

a means for mounting one or more vehicle system components having high mass as a common movable structure, said mounting means movable, under crash acceleration, in at least one axis from a constrained first position through a range of motion to a displaced second position, the mounting means acquiring kinetic energy through said acceleration;

means for constraining the mounting means in the first position; and means responsive to the motion of the mounting means for converting motion and kinetic energy of the mounting means to secondary motion in the safety system.

2. A device as defined in claim 1 wherein the means for constraining the mounting means comprises:

a first restraining means for engaging the mounting means in the first position; and a deformable member interconnecting a vehicle frame portion to the mounting means, the deformable member urging the mounting means against the first restraining means, the deformable member deforming under crash acceleration.

3. A device as defined in claim 2 wherein the deformable member deforms at a predetermined parametric rate dependent on the crash acceleration and a relative position of the mounting means within the range of motion.

4. A device as defined in claim 1 wherein the safety system is an impact surface repositioning device and the responsive means comprises interconnection means for translating the motion of the mounting means to motion of the impact surface, placing the impact surface in closer proximity to an occupant of the vehicle, thereby reducing impact velocity of the occupant against the surface under crash acceleration.

5. A device as defined in claim 4 wherein the impact surface is the steering wheel and steering column and the interconnection means comprises a mechanical linkage connected to the mass and steering column, the linkage translating motion of the mass in the at least one axis to motion of the steering wheel and steering column substantially along an axis of the steering column to position the steering wheel in closer proximity to the upper torso of the occupant.

6. A safety system activation and energy supply device for personal vehicles, the device responsive to crash accelerations imparted on the vehicle and comprising:

an inertial mass movable under crash acceleration in at least one axis from a constrained first position through a range of motion to a displaced second position, the mass acquiring kinetic energy through said acceleration;

means for constraining the mass in the first position;

means responsive to the motion of the mass for converting motion and kinetic energy of the mass into secondary motion; and an impact surface comprising a steering wheel and steering column, said responsive means comprising a mechanical linkage connected to the mass and steering column, the linkage translating motion of the mass in the at least one axis to motion of the steering wheel and steering column substantially along an axis of the steering column to position the steering wheel in closer proximity to the upper torso of the occupant.

7. A device as defined in claim 6 further comprising:

an airbag mounted in the steering column;

a bellows connected to the mass, the bellows undergoing compression as the mass moves through the range of motion from the first position to the second position;

interconnection conduit connected between the bellows and air bag whereby fluid contained in the bellows and pressurized by compression of the bellows is expelled through the interconnection conduit into the air bag, thereby inflating the air bag.

8. A device as defined in claim 6 wherein the steering column further comprises a collapsible member, intermediate the steering wheel and the interconnection means, for absorbing impact energy of an occupant on the steering wheel.

* * * * *

UNITED STATES PATENT AND TRADEMARK OFFICE
CERTIFICATE OF CORRECTION

PATENT NO. : 5,249,826

DATED : October 5, 1993

INVENTOR(S) : Lon Bell

Page 1 of 2

It is certified that error appears in the above-indentified patent and that said Letters Patent is hereby corrected as shown below:

On the Front Page:

[56] References Cited, U.S. PATENT DOCUMENTS, change
"5,054,870  10/1991  Backhaus et al.280/777" to
-- 5,054,810  10/1991  Backhaus et al.280/777 --.

Abstract, line 6, change "likelyhood" to -- likelihood --.

In the Specification:

Column 1, line 19, change "including" to -- include --.
Column 1, line 48, change "non polluting" to
         -- nonpolluting --.
Column 1, lines 48,49, change "non petroleum" to
         -- nonpetroleum --.

Figure 17:
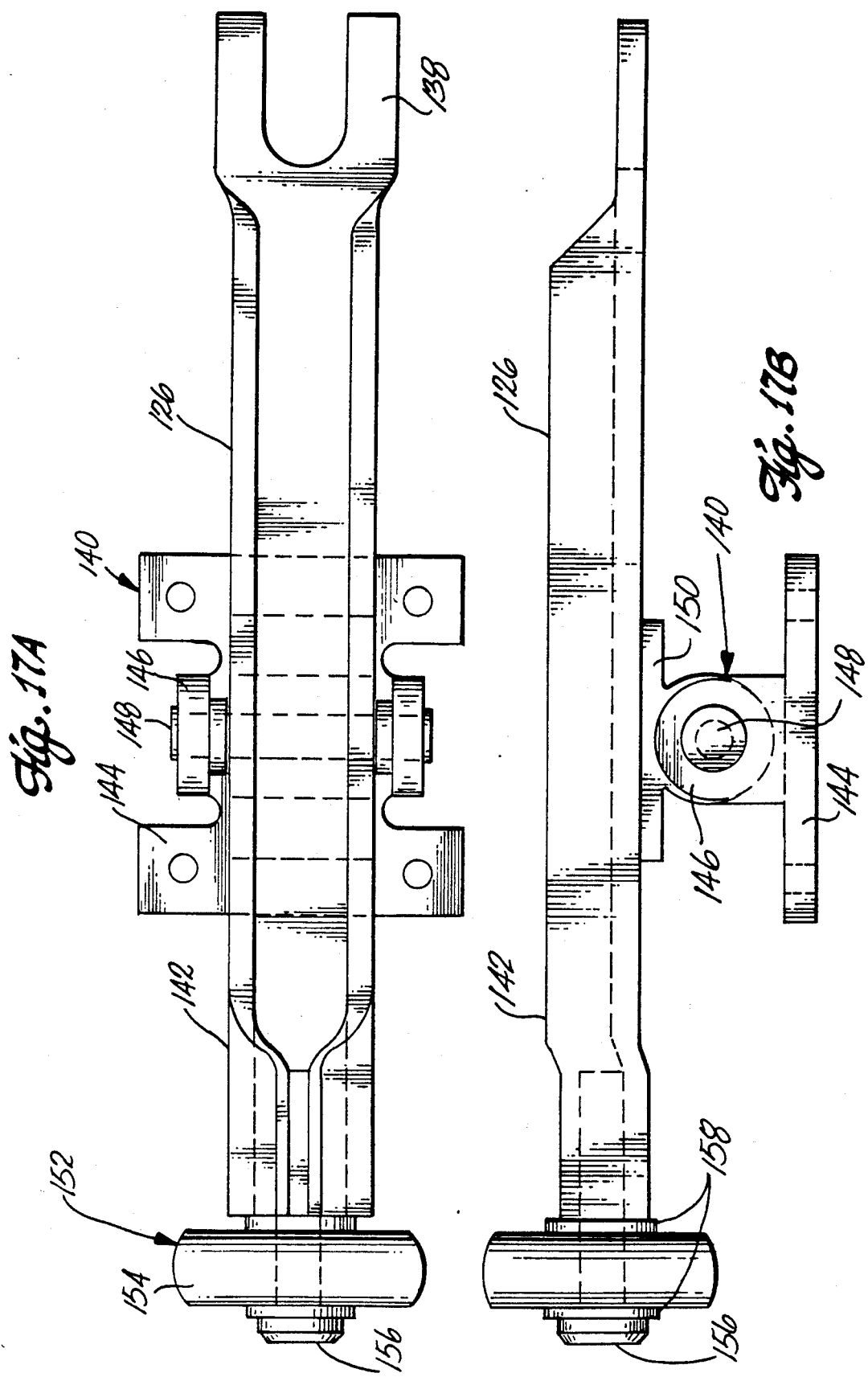
FIG. 17 is a front view of the pivoting actuator arm employed for steering column extension in the present embodiment.

Column 3, line 49, change "FIG. 17" to -- FIG. 17A --.

Column 4, line 28, before "occupant" change "a"
         to -- an --.

Column 5, line 15, before "incorporated" change "has"
         to -- as --.
Column 5, line 64, after "inertia" change "real"
         to -- reel --.

Column 6, line 22, after "required" insert -- for --.
Column 6, line 27, change "regards" to -- regard --.
Column 6, line 38, after "pressurized" insert -- gas --.

Column 7, line 20, change "Vertical" to -- vertical --.

UNITED STATES PATENT AND TRADEMARK OFFICE
CERTIFICATE OF CORRECTION

PATENT NO. : 5,249,826
DATED : October 5, 1993
INVENTOR(S) : Lon Bell

It is certified that error appears in the above-indentified patent and that said Letters Patent is hereby corrected as shown below:

```
Column 8, line 24, after "means" insert -- 128 --.
Column 8, line 25, after "Conventional" insert
          -- steering --.
Column 8, line 28, change "FIG." to -- FIGS. --.
Column 8, line 54, after "phantom)" insert a period.
Column 8, line 56, after "column" change "in" to -- is --.
Column 8, line 67, change "FIG." to -- FIGS. --.

Column 9, line 12, change "FIG." to -- FIGS. --.
Column 9, line 66, after "engaging" insert -- the --.
Column 9, line 67, before "panel" insert -- instrument --.

Column 10, line 1, before "greater" insert -- provides --.
Column 10, line 35, change "FIG." to -- FIGS. --.
Column 10, line 37, change "batters" to -- battery --.
```

Signed and Sealed this

Twelfth Day of July, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,249,826
DATED : October 5, 1993
INVENTOR(S) : Lon Bell

It is certified that error appears in the above-indentified patent and that said Letters Patent is hereby corrected as shown below:

Column 12, claim 7, line 34, delete "fluid" and insert therefor -- gas --.

Signed and Sealed this

Thirteenth Day of September, 1994

Attest:

BRUCE LEHMAN

*Attesting Officer*    *Commissioner of Patents and Trademarks*